US009396661B2

(12) United States Patent
Okamoto

(10) Patent No.: US 9,396,661 B2
(45) Date of Patent: Jul. 19, 2016

(54) PLATOON TRAVEL SYSTEM

(71) Applicant: DENSO CORPORATION, Kariya, Aichi-pref. (JP)

(72) Inventor: Kazuya Okamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/249,729

(22) Filed: Apr. 10, 2014

(65) Prior Publication Data

US 2014/0316865 A1     Oct. 23, 2014

(30) Foreign Application Priority Data

Apr. 17, 2013   (JP) .................................. 2013-086888

(51) Int. Cl.
*G06F 19/00*       (2011.01)
*G06G 7/70*        (2006.01)
(Continued)

(52) U.S. Cl.
CPC ................ *G08G 1/22* (2013.01); *G05D 1/0293* (2013.01); *G05D 2201/0213* (2013.01)

(58) Field of Classification Search
CPC ....... G08G 1/0104; G08G 1/052; G08G 1/22; G08G 1/20; G08G 1/091; G08G 1/096758; G08G 1/087; G08G 1/0129; G08G 1/095; G06Q 30/0202; G06Q 10/06; G06Q 20/203; G06Q 10/08; G05D 1/0022; G05D 13/02; G05D 1/0027; G05D 1/0038; G05D 1/0088
USPC ........... 701/117, 1, 118, 119, 70, 36, 22, 102, 701/2, 20, 96, 23, 512, 71; 705/7.31, 14.1, 705/14.26, 14.53; 340/916, 932, 903, 989, 340/990
See application file for complete search history.

(56) References Cited

U.S. PATENT DOCUMENTS 6,032,097 A * 2/2000 Iihoshi ..................... G08G 1/22
                                                        180/168
6,167,331 A * 12/2000 Matsumoto ............ G08G 1/075
                                                        318/587
(Continued)

FOREIGN PATENT DOCUMENTS

JP       1998-261195 A       9/1998
JP       1998-293899 A       11/1998
(Continued)

OTHER PUBLICATIONS

U.S. Appl. No. 14/249,700, filed Apr. 10, 2014, Okamoto.
(Continued)

*Primary Examiner* — Calvin Cheung
*Assistant Examiner* — Luis A Martinez Borrero
(74) *Attorney, Agent, or Firm* — Posz Law Group, PLC

(57) ABSTRACT

A platoon travel system organizes and performs a platoon travel of plural vehicles along a preset travel route. The system has a grouping unit that divides the plural vehicles into a top group and a tail end group based on projection area information of the vehicles, and groups vehicles with a projection area in a first range to the top group and vehicles with a projection area in a second range to the tail end group, which is less than the first range. A final position determination unit determines a position of each of the plural vehicles in the vehicle groups based on the depart point information, positions the top group vehicles in an ascending order of depart point distances, and positions the tail end group vehicles in a descending order of depart point distances, thereby preventing deterioration of whole platoon energy consumption.

16 Claims, 22 Drawing Sheets

(51) Int. Cl.
*G06G 7/76* (2006.01)
*G08G 1/00* (2006.01)
*G05D 1/02* (2006.01)

(56) References Cited

U.S. PATENT DOCUMENTS

| | | | | |
|---|---|---|---|---|
| 6,301,530 B1* | 10/2001 | Tamura | ........... | G05D 1/024 180/168 |
| 6,356,820 B1* | 3/2002 | Hashimoto | ........... | G08G 1/22 180/167 |
| 6,397,149 B1* | 5/2002 | Hashimoto | ........... | G05D 1/0297 455/99 |
| 8,352,112 B2* | 1/2013 | Mudalige | ........... | G08G 1/163 340/435 |
| 8,441,374 B2* | 5/2013 | Yokoyama | ........... | G08G 1/096 340/905 |
| 8,620,517 B2* | 12/2013 | Caveney | ........... | G05D 1/0295 701/31.5 |
| 8,649,962 B2* | 2/2014 | Davis | ........... | G01C 21/3492 701/117 |
| 8,738,275 B2* | 5/2014 | Shida | ........... | G08G 1/22 701/117 |
| 8,775,060 B2* | 7/2014 | Solyom | ........... | G08G 1/22 180/168 |
| 8,781,707 B2* | 7/2014 | Kagawa | ........... | B60W 30/16 340/903 |
| 8,798,907 B2* | 8/2014 | Shida | ........... | G01S 5/0072 701/301 |
| 8,831,820 B2* | 9/2014 | Sato | ........... | G08G 1/22 340/5.64 |
| 8,914,225 B2* | 12/2014 | Caskey | ........... | G08G 1/00 701/117 |
| 8,972,080 B2* | 3/2015 | Shida | ........... | G08G 1/0104 701/117 |
| 8,989,995 B2* | 3/2015 | Shida | ........... | B60W 30/165 701/117 |
| 9,037,389 B2* | 5/2015 | You | ........... | G08G 1/22 701/117 |
| 9,141,112 B1* | 9/2015 | Loo | ........... | G05D 1/0293 |
| 9,202,379 B2* | 12/2015 | Yamashiro | ........... | G08G 1/22 |
| 2002/0059017 A1* | 5/2002 | Yamane | ........... | G08G 1/0104 701/1 |
| 2004/0049343 A1* | 3/2004 | Yamadaji | ........... | G08G 1/161 701/301 |
| 2008/0059007 A1* | 3/2008 | Whittaker | ........... | G05D 1/027 701/2 |
| 2008/0154629 A1* | 6/2008 | Breed | ........... | B60N 2/2863 705/1.1 |
| 2009/0030596 A1* | 1/2009 | Okude | ........... | G01C 21/26 701/117 |
| 2009/0048768 A1* | 2/2009 | Taguchi | ........... | G08G 1/166 701/117 |
| 2009/0140887 A1* | 6/2009 | Breed | ........... | G01C 21/165 340/990 |
| 2010/0256836 A1* | 10/2010 | Mudalige | ........... | G08G 1/22 701/2 |
| 2010/0256852 A1* | 10/2010 | Mudalige | ........... | G08G 1/22 701/24 |
| 2011/0029358 A1* | 2/2011 | Hyde | ........... | G06Q 30/02 705/14.1 |
| 2011/0093177 A1* | 4/2011 | Horn | ........... | B60W 30/16 701/70 |
| 2011/0288754 A1* | 11/2011 | Shida | ........... | G08G 1/22 701/117 |
| 2012/0323474 A1* | 12/2012 | Breed | ........... | B60W 30/04 701/117 |
| 2013/0041567 A1* | 2/2013 | Yamashiro | ........... | B60T 7/22 701/96 |
| 2013/0079953 A1* | 3/2013 | Kumabe | ........... | G05D 1/024 701/2 |
| 2013/0080040 A1* | 3/2013 | Kumabe | ........... | G05D 1/0293 701/117 |
| 2013/0080041 A1* | 3/2013 | Kumabe | ........... | G05D 1/024 701/117 |
| 2013/0103291 A1* | 4/2013 | Hayashida | ........... | G08G 1/0125 701/117 |
| 2013/0218365 A1* | 8/2013 | Caveney | ........... | G05D 1/0295 701/1 |
| 2013/0338855 A1* | 12/2013 | Mason | ........... | G07C 5/0816 701/2 |
| 2014/0100734 A1* | 4/2014 | Yamashiro | ........... | G08G 1/22 701/23 |
| 2014/0107867 A1* | 4/2014 | Yamashiro | ........... | G08G 1/22 701/2 |
| 2014/0172265 A1* | 6/2014 | Funabashi | ........... | G08G 1/163 701/96 |
| 2015/0120181 A1* | 4/2015 | Puhler | ........... | G01C 21/3438 701/422 |
| 2015/0154871 A1* | 6/2015 | Rothoff | ........... | G08G 1/22 701/2 |

FOREIGN PATENT DOCUMENTS

| | | |
|---|---|---|
| JP | 1999-328584 A | 11/1999 |
| JP | 2006-261742 A | 9/2006 |
| JP | 2009-157790 A | 7/2009 |
| JP | 2009-157794 A | 7/2009 |

OTHER PUBLICATIONS

Office Action mailed Mar. 3, 2015 issued in corresponding JP patent application No. 2013-86891 (and English translation).
Office Action mailed Aug. 24, 2015 issued in related U.S. Appl. No. 14/249,700.
Final Office Action mailed Feb. 12, 2016 issued in related U.S. Appl. No. 14/249,700.

* cited by examiner

PLATOON TRAVEL SYSTEM

CROSS REFERENCE TO RELATED APPLICATION

The present application is based on and claims the benefit of priority of Japanese Patent Application No. 2012-86888, filed on Apr. 17, 2013, the disclosure of which is incorporated herein by reference.

TECHNICAL FIELD

The present disclosure generally relates to a platoon travel system for organizing a platoon of vehicles and performing a platoon travel of vehicles.

BACKGROUND INFORMATION

Platoon travel systems are generally known. For example, a patent document 1 (i.e., Japanese Patent Laid-Open No. 2009-157790) discloses a platoon travel system. The platoon travel system is equipped with a self-vehicle information acquisition processing unit with which the platoon travel system acquires self-vehicle information. A nearby-vehicle information acquisition processing unit acquires information about nearby vehicles, and a platoon organization processing unit retrieves a projection area of each self-vehicle from the self-vehicle information and nearby vehicles from the nearby-vehicle information. The platoon organization processing unit then organizes the platoon based on the retrieved projection areas of the respective vehicles. Further, in a patent document 2 (i.e., Japanese Patent Laid-Open No. 2009-157794), a similar projection-area based platoon organization is disclosed.

However, when a platoon is based on the projection area of each of the vehicles, the platoon may temporarily collapse when a vehicle joins the platoon or when a vehicle departs from the platoon. In other words, in the platoon travel of vehicles, a vehicle interval may be widened in order to make room for a joining vehicle or for a departure of a vehicle from the platoon, which leaves a vacant position. Therefore, in the platoon travel system, after a collapse of the platoon and before a re-organization/reconstruction of the platoon, the energy consumption of the whole platoon may increase. Further, if such re-organization/reconstruction is frequent, the increase of the energy consumption may further increase.

Further, the vehicles participating in the platoon may have respectively different travel outputs (e.g., different horsepower output from the respective vehicles for the travel of those vehicles). Therefore, in the above-mentioned platoon travel system, even when the platoon is organized based on the projection area of each of the vehicles, a low-power vehicle may sometimes be positioned in front of a high-power vehicle. In other words, a lead vehicle may have a higher power than a following vehicle in the above-mentioned platoon travel system. In the above situation, a "high travel output power" and a "low travel output power" regarding the output of the vehicle are used as relative terms, indicating that travel output powers are different from vehicle to vehicle.

Further, when the vehicles of different travel outputs travel with the same amount of travel resistance, the low travel output vehicles consume more energy than the high travel output vehicles. Therefore, when the low travel output vehicles are positioned in front of the high travel output vehicles, the energy consumption of the whole platoon may increase.

Furthermore, the vehicles participating in the platoon have respectively different remaining energies. Therefore, in the above-mentioned platoon travel system, even when the platoon is organized based on the projection area of each of the vehicles, vehicles having low remaining energy may be positioned in front of vehicles having high remaining energy. In the above, high and low regarding the remaining energies are used as relative terms, indicating that remaining energies are different from vehicle to vehicle. Therefore, in other words, in the above-mentioned platoon travel system, the lead vehicle may have lower remaining energy than the following vehicle. Thus, in such positioning of the vehicles, the low remaining energy vehicle may benefit from low energy consumption reduction effects (e.g., low fuel saving amounts) even in the platoon travel, with possibly little or no extended travel distance.

SUMMARY

It is a first object of the present disclosure to provide the platoon travel system that prevents deterioration of whole platoon energy consumption. Further, a second object of the present disclosure is to provide the platoon travel system that realizes an extended travel distance of the vehicles participating in the platoon.

In an aspect of the present disclosure for the achievement of the above objects, the platoon travel system of the present disclosure organizing the platoon of plural vehicles and performing the platoon travel of the plural vehicles along a preset travel route. The platoon travel system includes a first acquisition unit acquiring, from each of the plural vehicles, projection area information which shows a projection area of each vehicle, a second acquisition unit acquiring, from each of the plural vehicles, depart point information which shows a depart point at which each vehicle departs from the preset travel route of the platoon, a grouping unit that divides the plural vehicles into a lead vehicle group and a follow vehicle group based on the projection area information, among which the vehicles with the projection area in a first range belong to the lead vehicle group and the vehicles with the projection area in a second range belong to the follow vehicle group, and the second range of the projection area is less than the first range of the projection area, and a final position determination unit that determines an in-group position of each of the plural vehicles in the vehicle groups based on the depart point information, positioning the lead group vehicles in an ascending order of depart point distances and positioning the follow group vehicles in a descending order of depart point distances (i.e., a vehicle having a near depart point moves to a top of the lead group, which is also a top of the platoon, with the other lead group vehicles respectively having step-by-step farther depart points in order, and a vehicle having a near depart point comes to a tail end of the follow group, which is also a tail end of the platoon, with the other follow group vehicles having step-by-step farther depart points in a reverse order toward the top of the follow group or the platoon).

As described above, by grouping the vehicles having the first range projection areas in the lead group of the platoon and by grouping the vehicles having the second range projection areas in the follow group of the platoon, the second range projection area vehicles are positioned to follow the first range projection area vehicles. Thus, the vehicles in the follow group have lower travel resistance than if they traveled alone without having the lead group. As a result, the energy consumption of the whole platoon is reduced.

Further, by positioning the vehicles in an ascending order of depart point distances in the lead group and by positioning the vehicles in a descending order of depart point distances in the follow group (i.e., in the lead group, a vehicle order from a top of the platoon is a near depart point vehicle to a far depart point vehicle, and, in the follow group, a vehicle order from a tail end toward the top of the platoon is a near depart point vehicle to a far depart point vehicle), the deterioration of whole platoon energy consumption is prevented. In other words, the platoon organization/re-organization in the above-described manner always makes the departing vehicle depart either from a top of the platoon or a tail end of the platoon. In such manner, the platoon will be less frequently collapsed. To put it differently, a vacant position in the platoon caused by the departure of a vehicle from the platoon will be less frequently generated. For such reason, the platoon travel system of the present disclosure prevents deterioration of whole platoon energy consumption caused by the vacant position in the platoon. In other words, the deterioration of whole platoon energy consumption in a period after a collapse of the platoon and before re-organization of the platoon (i.e., during the platoon reform period) is prevented by the platoon travel system of the present disclosure.

Further, in the present disclosure, the grouping unit determines a join-in group in which a joining vehicle joins based on the projection area information of the joining vehicle which is going to join in the platoon, and the final position determination unit determines a join position of the joining vehicle in the join-in group based on the depart point information of the joining vehicle. It may be preferable to have a first drive unit that performs a speed reduction control of the vehicles that are positioned behind the join position in order to reserve a join space at the join position in the platoon.

In the above-described manner, travel resistance is reduced than the join space reservation by accelerating the vehicles traveling in front of the join position, thereby preventing deterioration of the energy consumption.

Further, in the present disclosure, to achieve the above objects, the platoon travel system organizing the platoon of plural vehicles and performing the platoon travel of the plural vehicles along a preset travel route. The platoon travel system includes a first acquisition unit that acquires from each of the plural vehicles projection area information which shows a projection area of each of the plural vehicles, a second acquisition unit that acquires from each of the plural vehicles remaining energy information which shows a remaining energy of each of the plural vehicles, a grouping unit that divides the plural vehicles into a lead group and a follow group based on the projection area information among which the vehicles with the projection area in a first range belong to the lead vehicle group and the vehicles with the projection area in a second range belong to the following vehicle group, and in which the second range of the projection area is defined as smaller than the first range of the projection area, and a final position determination unit that determines an in-group position of each of the plural vehicles in the vehicle groups based on the remaining energy information, positioning the lead group vehicles in a descending order of the remaining energies and positioning the follow group vehicles in an ascending order of the remaining energies.

Therefore, by grouping the vehicles having the first range projection areas the lead group of the platoon and by grouping the vehicles having the second range projection areas the follow group of the platoon, the second range projection area vehicles are positioned to follow the first range projection area vehicles. Thus, the vehicles in the follow group have lower travel resistance than if they travel alone without having the lead group. As a result, the energy consumption of the whole platoon is reduced by the vehicle positioning scheme of the present disclosure.

Further, by positioning the vehicles in an descending order of the remaining energies in the lead group and by positioning the vehicles in an ascending order of the remaining energies in the follow group (i.e., in the lead group, a vehicle order from a top of the platoon is a high remaining energy vehicle to a low remaining energy vehicle, and, in the follow group, a vehicle order from a tail end toward the top of the platoon is a high remaining energy vehicle to a low remaining energy vehicle), the travel distance of the low so remaining energy vehicle is extended. In other words, since the travel resistance of each of platoon vehicles participating in the platoon is lower for middle vehicles, which are traveling in the middle of the platoon, compared to top vehicles and tail vehicles of the platoon, the energy consumption of the middle vehicles is made lower. Therefore, by positioning the low remaining energy vehicles in the middle of the platoon, the middle position vehicles in the platoon can extend the travel distance.

Further, in the present disclosure, to achieve the above objects, the platoon travel system organizing the platoon of plural vehicles and performing the platoon travel of the plural vehicles along a preset travel route. The platoon travel system includes a first acquisition unit that acquires from each of the plural vehicles projection area information which shows a projection area of each of the plural vehicles, a second acquisition unit that acquires from each of the plural vehicles travel output information which shows a travel output of each of the plural vehicles, a grouping unit that divides the plural vehicles into a lead group and a follow group based on the projection area information among which the vehicles with the projection area in a first range belong to the lead vehicle group and the vehicles with the projection area in a second range belong to the following vehicle group, and in which the second range is defined as smaller than the first range, and a final position determination unit that determines an in-group position of each of the plural vehicles in the vehicle groups based on the travel output information, positioning the lead group vehicles in a descending order of the travel outputs and positioning the follow group vehicles in an ascending order of the travel outputs.

Therefore, by grouping the vehicles having the first range projection areas the lead group of the platoon and by grouping the vehicles having the second range projection areas the follow group of the platoon, the second range projection area vehicles are positioned to follow the first range projection area vehicles. Thus, the vehicles in the follow group have lower travel resistance than they travel alone without having the lead group. As a result, the energy consumption of the whole platoon is reduced by the vehicle positioning scheme of the present disclosure.

Further, by positioning the vehicles in an descending order of the travel outputs in the lead group and by positioning the vehicles in an ascending order of the travel outputs in the follow group (i.e., in the lead group, a vehicle order from a top of the platoon is a high travel output vehicle to a low travel output vehicle, and, in the follow group, a vehicle order from a tail end toward the top of the platoon is a high travel output vehicle to a low travel output vehicle), deterioration of whole platoon energy consumption is prevented. In other words, since the travel resistance of each of platoon vehicles participating in the platoon is lower for middle vehicles, which are traveling in the middle of the platoon, compared to top vehicles and tail vehicles of the platoon, the energy consumption of the middle vehicles is made lower. Therefore, by positioning the low travel output vehicles in the middle of the platoon, deterioration of whole platoon energy consumption is prevented. Further, by positioning the high travel output vehicles at the top and at the tail end of the platoon and by positioning the low travel output vehicles in the middle of the platoon, the platoon travel of the vehicles is made smoother (i.e., is made to have a higher platoon travel speed).

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
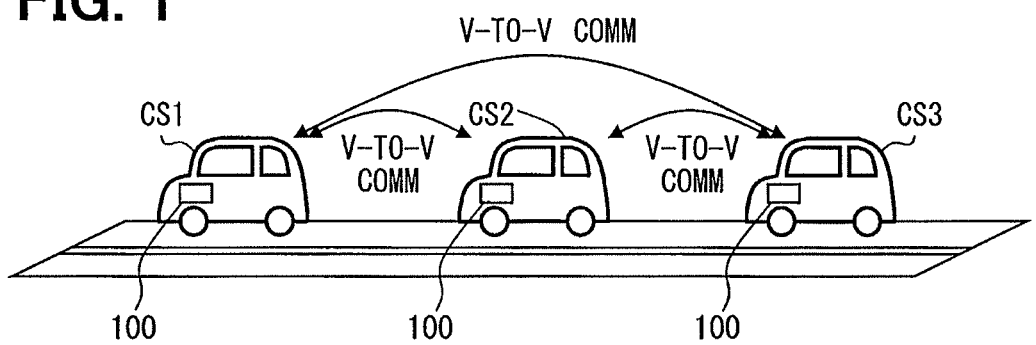
FIG. 1 is an illustration of the platoon travel system in an embodiment of the present disclosure.

Hereafter, an embodiment of the present disclosure is described based on the drawings. As shown in FIG. 1, the platoon travel system is a system for organizing and performing platoon travel of plural vehicles, in which a platoon of vehicles is organized/formed by plural platoon vehicles and a leader vehicle in the platoon is followed by follower vehicles based on control information that is transmitted/passed among the platoon vehicles. In other words, the platoon travel is a group of traveling vehicles, i.e., plural vehicles traveling in one group. Therefore, the platoon travel can be put in another way as a travel of vehicle groups. The vehicles (e.g., CS1-CS3, etc.) which adopt the platoon travel system are provided with an on-board unit 100, respectively. In the present embodiment, the system adopts the multi-master method in which the platoon travel control is performed by all of the platoon vehicles, respectively, serving as a master of the platoon.

The platoon in the present embodiment consists of the first vehicle group containing plural vehicles and the second vehicle group containing plural vehicles. Further, the body size of the vehicles in the first vehicle group and the body size of the vehicles in the second vehicle group are different. In other words, the vehicles having a predetermined body size range (i.e., in the first range) belong to the first vehicle group, and, on the other hand, the vehicles having a second body size range, which defines a smaller body size than the first range, belong to the second vehicle group. Therefore, the vehicles in the first vehicle group have substantially the same body size, and, similarly, the vehicles in the second vehicle group have substantially the same body size. However, the body size differs between the vehicles in the first vehicle group and the vehicles in the second vehicle group. The vehicles participating in the platoon may be hereafter called platoon vehicles. A "vehicle group" may also be called, simply, as a "group."

The body size of the vehicles may also be referred to as a projection area (i.e., size) of the vehicles. A projection area here is the area size calculated as a product of the width of a vehicle and an overall height (i.e., a length from a ground surface to the highest point of the vehicle).

Figure 8:
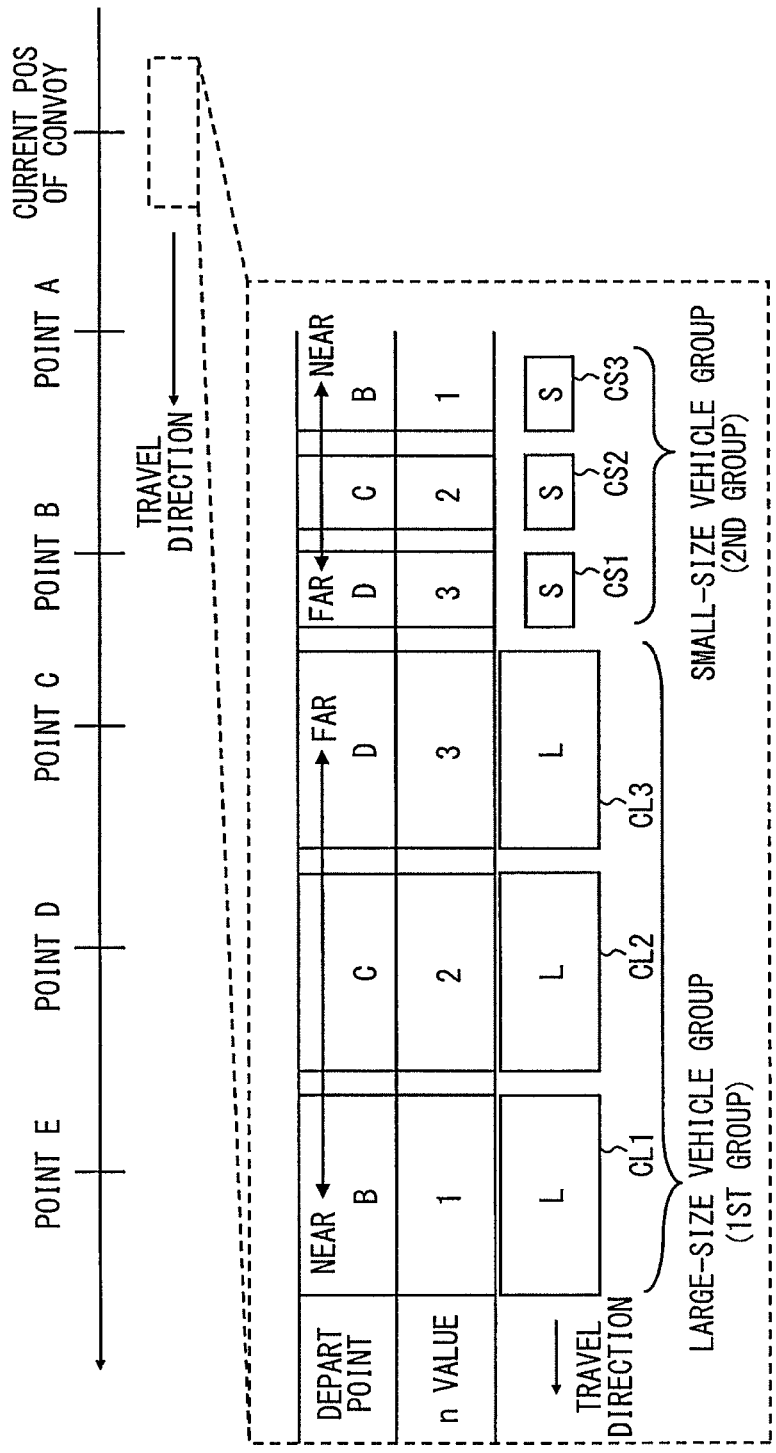
FIG. 8 is an illustration of the platoon that includes two different types of vehicle groups.

According to the present embodiment, an example of the platoon is so shown in FIG. 8. This platoon includes a large-size vehicle group (i.e., the first vehicle group/the first group) containing three the large-size vehicles CL1-CL3 and a small-size vehicle group (i.e., the second vehicle group/the second group) containing three the small-size vehicles CS1-CS3. However, the present disclosure is not limited to such configuration. For example, it is possible to have the platoon formed as a combination of a medium-size vehicle group (i.e., the first vehicle group/the first group) including plural medium-size vehicles and the small-size vehicle group (i.e., the second vehicle group/the second group) containing plural the small-size vehicles. Similarly, it is possible to have the platoon formed as a combination of a large-size vehicle group (i.e., the first vehicle group/the first group) including plural the large-size vehicles and a medium-size vehicle group (i.e., the second vehicle group/the second group) containing plural medium-size vehicles. Further, the number of vehicles in each vehicle group is not limited to three. Furthermore, the number of vehicles in the first vehicle group and the number of vehicles in the second vehicle group may be different. A large-size vehicle may include a truck, a bus, and the like. A medium-size vehicle may include a large-size passenger vehicle and the like. A small-size vehicle may include a medium-size passenger vehicle, a small-size passenger vehicle and the like.

The platoon shown in FIG. 8 passes through a point A, a point B, a point C, a point D, and a point E from the current position of the platoon. Therefore, the travel route of the platoon includes the current position, the point A, the point B, the point C, the point D, and the point E. The large-size vehicle CL1 departs from the platoon at the point B. The large-size vehicle CL2 departs from the platoon at the point C. The large-size vehicle CL3 departs from the platoon at the point D. The small-size vehicle CS1 departs from the platoon at the point D. The small-size vehicle CS2 departs from the platoon at the point C. The small-size vehicle CS3 departs from the platoon at the point B. Further, a value "n" in FIG. 8 will be explained in detail later.

Figure 2:
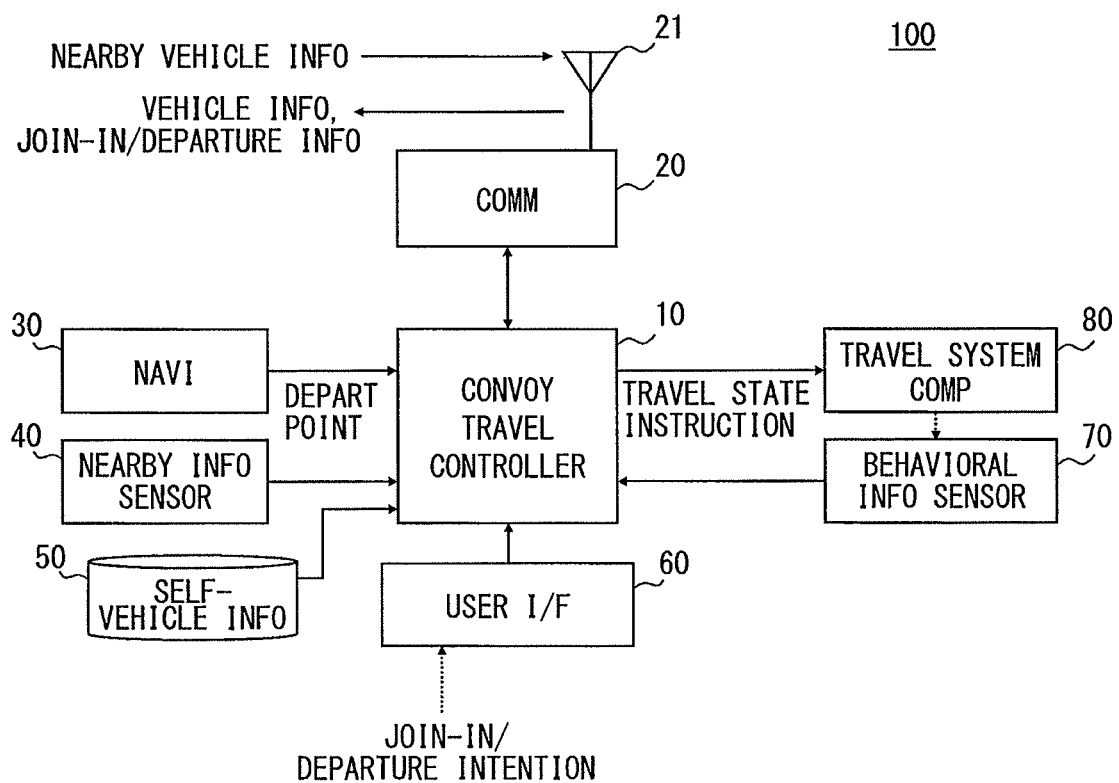
FIG. 2 is a block diagram of an on-board unit in an embodiment of the present disclosure.

Here, the configuration of the on-board unit 100 is explained with reference to FIG. 2. The on-board unit 100 is provided with a platoon travel controller 10, a communication device 20, a nearby information sensor 40, a memory unit 50, a user interface 60, a behavioral information sensor 70, a travel system component 80, and the like.

The platoon travel controller 10 is a computer provided with CPU, ROM, RAM (none of them illustrated), together with other parts. Hereafter, the platoon travel controller 10 may simply be referred to as an ECU 10. The ECU 10 performs the platoon travel control by using the CPU which executes a program memorized by the ROM with a help of a temporary storage function of the RAM and by controlling the communication device 20 and the travel system component 80 according to such platoon travel control. Further, the ECU 10 instructs a travel state to the travel system component 80, for example. Further, the details of the ECU 10 are explained later.

The communication device 20 (i.e., a communication unit in the claims) is provided with an antenna 21 (i.e., a communication unit in the claims), and performs wireless communications with the vehicles which are around a self-vehicle (i.e., with nearby vehicles), and functions as a transmitter and a receiver. In other words, the communication device 20 is provided with a function as a vehicle-to-vehicle communication device, for example, making it possible to transmit and receive information to/from other vehicles by DSRC (i.e., Dedicated Short-Range Communications). Further, the communication device 20 may also be implemented as a device that is capable of performing both of a simultaneous transmission communication, which transmits the same information to all vehicles in a communication range, for example, and an "individual" communication, which specifies a communication partner. The communication device 20 receives, from the nearby vehicles via the antenna 21, nearby-vehicle information of the nearby vehicles, join-in intention information of the nearby vehicles, and departure information of the nearby vehicles, and outputs the various received information to the ECU 10. The communication device 20 transmits, to the nearby vehicles via the antenna 21, vehicle information, the join-in intention information, the departure information and the like of the self-vehicle according to the instructions from the ECU 10. Further, the communication device 20 may also be provided with, in addition to the function as a vehicle-to-vehicle communication device, a function as a road-to-vehicle communication device.

Further, the nearby vehicles are respectively defined as a vehicle which adopts the platoon travel system and is positioned around the self-vehicle. Therefore, the nearby vehicles are provided with the on-board unit 100. Further, the nearby vehicles not only include the vehicles that have participated in the platoon but also include the vehicles which have not yet participated in the platoon.

The above-mentioned vehicle information includes the information which shows the projection area of the self-vehicle (i.e., the projection area information), the information which shows a guidance route of the self-vehicle, and the like. Further, the vehicle information may include the information which shows a depart point (i.e., the depart point information) in addition to the information which shows the projection area of the self-vehicle and the information which shows the guidance route of the self-vehicle. The nearby-vehicle information is, in other words, the self-vehicle information of each of the nearby vehicles which is output from each of the nearby vehicles. The join-in intention information is the information which shows a join-in intention of the self-vehicle for joining in the platoon, which is in FIG. 3 and in other drawings, for example, designated as self-vehicle join-in intention information. The departure information is the information which shows a departure intention of the self-vehicle for departing from the platoon, which is in FIG. 3 and in other drawings, for example, designated as self-vehicle departure intention information. The departure information of the nearby vehicle is designated as other vehicle departure intention information in FIG. 3 and in other drawings. The join-in intention information of the nearby vehicle is designated as other vehicle join-in intention information in FIG. 3 and in other drawings.

Platoon information to be explained later includes the information which shows the projection area of each of the platoon vehicles, the information which shows a travel route (i.e., the guidance route) of each of the platoon vehicles, the information which shows a position of each of the platoon vehicles in the platoon, and the information which shows a depart point of each of the platoon vehicles. Further, the platoon information includes the information which shows the travel route of the platoon, the information which shows the number of vehicles in the first vehicle group, the information which shows the number of vehicles in the second vehicle group, and the like. The platoon information is the information shared among all platoon vehicles. The re-organization request information which is explained later is the information which requests re-organization of the platoon.

A navigation device 30 detects a current position of the self-vehicle, calculates a guidance route from the detected current position to a destination with reference to map and the like, and performs a travel guidance based on the calculated guidance route. The navigation device 30 computes a depart point where the self-vehicle departs from the platoon based on the guidance route of the self-vehicle and the travel route of the platoon. Then, the navigation device 30 outputs, to the ECU 10, the information which shows the guidance route, the information which shows the depart point for the departure from the platoon, and the like.

The ECU 10 may also compute the travel route of the platoon based on the guidance route of the self-vehicle and the nearby-vehicle information (i.e., travel routes of the nearby vehicles) acquired from the nearby vehicles. Further when the platoon information is received from the nearby vehicles, the ECU 10 is enabled to acquire (i.e., to calculate) the travel route of the platoon from such platoon information. In such a case, the ECU 10 outputs the calculated travel route of the platoon to the navigation device 30. Since such a calculation of the travel route of the platoon is a well-known matter, detailed explanation of such calculation is omitted from the embodiment.

The information which shows a depart point may be output to the ECU 10 from the user interface 60, which is explained later in detail. In other words, a depart point may be specified by a vehicle occupant who operates the user interface 60. In the present embodiment, the information which shows a depart point is output to the ECU 10 when the vehicle occupant operates the user interface 60. Further, a depart point that is output from the user interface 60 is used by the ECU 10. The ECU 10 may also compute a depart point based on the guidance route of the self-vehicle and the travel route of the platoon.

Further, the navigation device 30 of the self-vehicle may compute, if the self-vehicle is already a platoon vehicle, a depart point of a joining vehicle which is newly joining in the platoon. In such case, the navigation device 30 computes a depart point of the joining vehicle based on the guidance route included in the vehicle information of the joining vehicle and the travel route of the platoon in the platoon information of the current platoon. The navigation device 30 outputs, to the ECU 10, the computed information which shows a depart point of the joining vehicle. If the ECU 10 receives the information which shows a depart point of the joining vehicle, the ECU 10 updates the platoon information by adding the information which shows a depart point of the joining vehicle to the current platoon information.

The nearby information sensor 40 detects the existence of vehicles before and behind the self-vehicle as well as an inter-vehicle distance to each of those vehicles, which may be implemented as a radar, a camera, and the like. The nearby information sensor 40 outputs the information which shows a detection result to the ECU 10. The nearby information sensor 40 may further detect a change of the detected inter-vehicle distance, and the sensor 40 may output the information which shows the change of the detected inter-vehicle distance to the ECU 10. The ECU 10 disposed in each of the platoon vehicles transmits the information which shows the inter-vehicle distance and the information which shows the change of the inter-vehicle distance to the other platoon vehicles other than the self-vehicle via the communication device 20 and the antenna 21. Further, the control information includes such an inter-vehicle distance and the change of the inter-vehicle distance, together with other information.

The memory unit 50 is a device for memorizing the vehicle information and the like, and may be implemented as a hard disk or the like.

The user interface 60 is disposed in a passenger compartment of a vehicle, which may be operated by the vehicle occupant. That is, the user interface 60 may be, for example, a device such as a joystick, a touch panel disposed on a display device, and the like. Further, the display device on which the touch panel is disposed may be implemented as a display device which is capable of displaying an instrument panel, map data, and the like.

The vehicle occupant can input (i) information which shows a depart point, (ii) a signal which shows a join-in intention to join in the platoon, (iii) a signal which shows a departure intention to depart from the platoon, and the like by operating a device of the user interface 60, for example. The ECU 10 instructs, to the communication device 20, transmission of the join-in intention information which shows a join-in intention to join the platoon, if the signal which shows a join-in intention is input by the user interface 60. The ECU 10 instructs, to the communication device 20, transmission of the departure information including (i) the information which shows a departure intention from the platoon and (ii) the information which shows a depart point outputted from the navigation device 30, if the signal which shows a departure intention by the user interface 60 is input by the user interface 60.

The behavioral information sensor 70 is used for detecting an action of the self-vehicle, and includes, for example, an acceleration sensor which detects an acceleration applied to the self-vehicle along a front-rear direction, a vehicle speed sensor which detects a travel speed (i.e., a vehicle speed) of the self-vehicle, a steering angle sensor which detects a steer angle relative to a straight-travel direction of the self-vehicle, a brake sensor which detects an amount of press of a brake pedal, and the like. The behavioral information sensor 70 outputs the information which shows detection results of these sensors to the ECU 10. Further, the control information may include the information which shows the above-described detection results.

A device having a numeral 80 is a travel system component, which includes a drive device, a brake device, and the like. In other words, the numeral 80 indicates devices such as an engine, a motor generator, a brake, a transmission, and the like in the self-vehicle.

Figure 3:
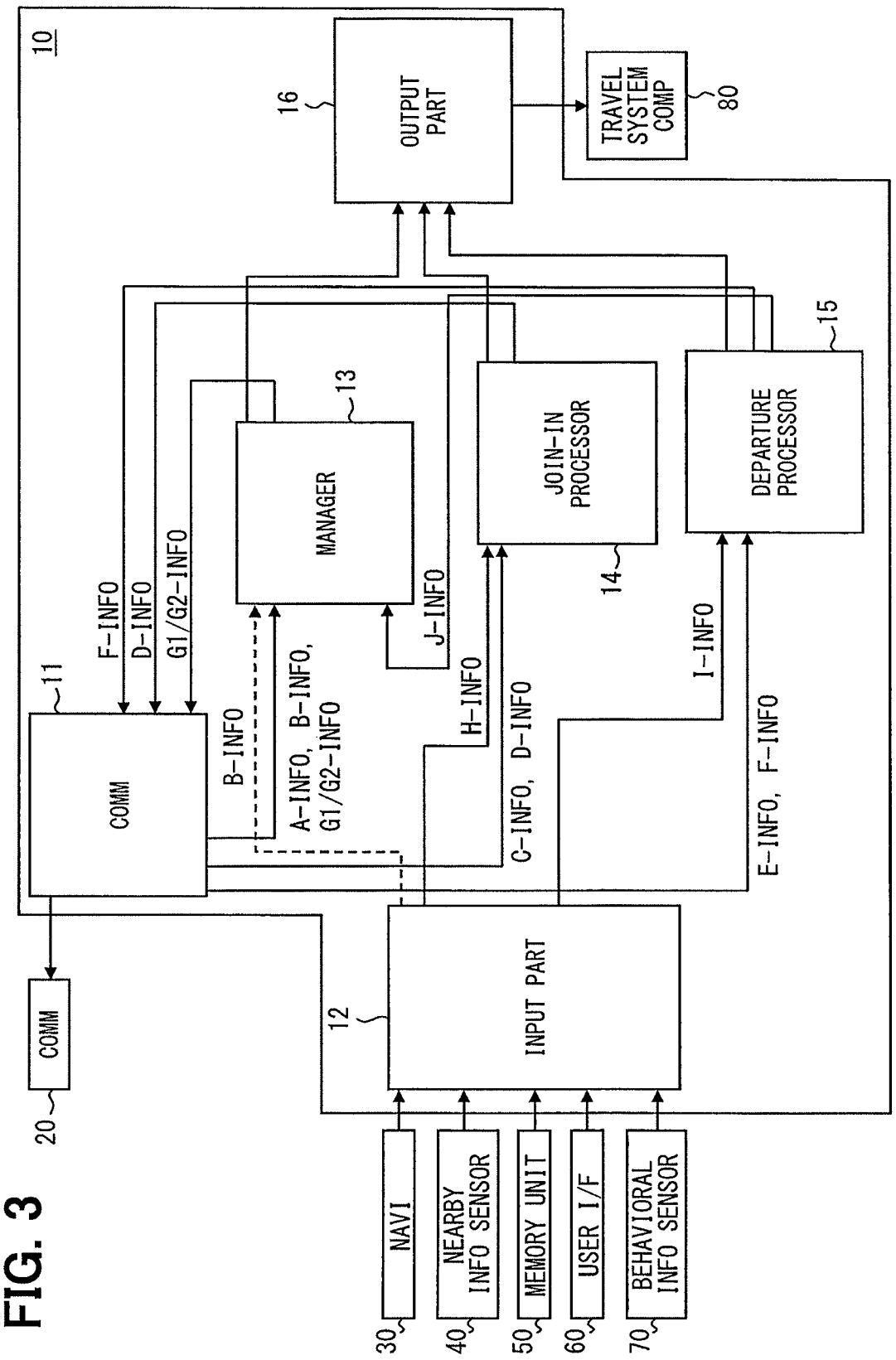
FIG. 3 is a block diagram of the platoon travel controller in an embodiment of the present disclosure.
Figure 4:
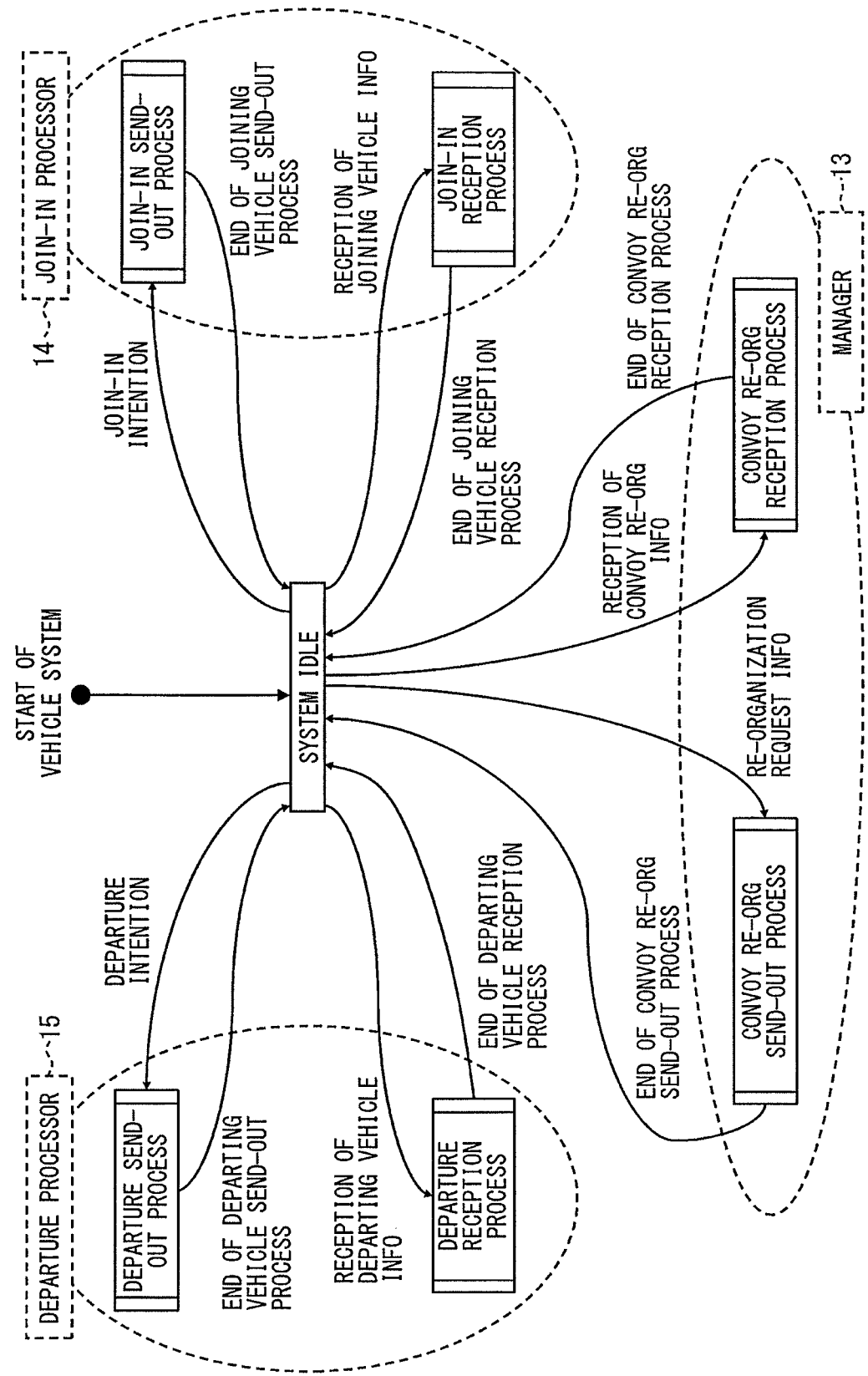
FIG. 4 is a state transition diagram of the processing operation of the platoon travel controller.

Here, explanation of the ECU 10 is provided with reference to FIG. 3 and FIG. 4. The ECU 10 includes, as functional blocks, a communication part 11, an input part 12, a platoon state management part 13, a join-in control processing part 14, a departure control processing part 15, and an output part 16. The ECU 10 performs the platoon travel control, as shown in FIG. 3 and in other drawings, by transmitting and receiving the information to/from each of these parts. The platoon state management part 13 may also be referred to as a manager 13 hereafter. The join-in control processing part 14 may also be referred to as a join-in processor 14 hereafter. The departure control processing part 15 may also be referred to as a departure processor 15 so hereafter.

The communication part 11 is connected to the communication device 20, and, based on a transmission instruction from each of the various parts, instructs, to the communication device 20, transmission of the vehicle information of the self-vehicle and the like, or acquires the nearby-vehicle information and the like, which is received by the communication device 20. The communication part 11 outputs the information acquired from the communication device 20 to each of the various parts, and/or holds the acquired information. When the communication part 11 holds the information acquired from the communication device 20, each of the various parts acquires the currently held information by polling in the communication part 11.

The communication part 11 outputs, as shown in FIG. 3, a variety of information regarding the platoon information (A-info), the re-organization request information (B-info), the other vehicle join-in intention information (C-info), pre-join-in process/during-join-in process information (i.e., D-info), as well as the other vehicle departure intention information (E-info), pre-departure process/during-departure process information (F-info), and pre-re-organization process information (G1-info), during-re-organization process information (G2-info). Further, to the communication part 11, the variety of information is input such as the pre-departure process/during-departure process information, the pre-join-in process/during-join-in process information, and the pre-re-organization process/during-re-organization process information. Among the above, the pre-olin-in process/during-join-in process information is the information processed in the flowcharts in FIG. 5 to FIG. 7. The pre-departure process/during-departure process information is the information processed in the flowchart in FIG. 10. The pre-organization process information and the during-re-organization process information are the information processed in the flowchart in FIG. 12. Each of the above-described information may include further detail information, respectively.

The input part 12 is a device to which the variety of information is input from the navigation device 30 and from which the input information is output to each of the various parts. The input part 12 outputs the re-organization request information (B-info), the self-vehicle join-in intention information (H-info), the self-vehicle departure intention information (I-info), and the like, as shown in FIG. 3.

The manager 13 performs a platoon re-organization send-out process and a platoon re-organization reception process, as shown in FIG. 4, the manager 13 outputs the variety of information processed at a time of a pre-re-organization process, the variety of information processed at a time of a during-re-organization process, the drive information for the travel system component 80, and the like. Further, to the manager 13, the re-organization request information, the platoon information, post-departure platoon information (J-info), and the like are input. Regarding the details of the platoon re-organization send-out process and the platoon re-organization reception process, description is provided later with reference to FIG. 12 and the like.

The join-in processor 14 performs a join-in send-out process and a join-in reception process, as shown in FIG. 4. The join-in processor 14 outputs the variety of information processed at a time of a pre-join-in process, the variety of information processed at a time of during-join-in process, the drive information for the travel system component 80, and the like. To the join-in processor 14, the self-vehicle join-in intention information, the other vehicle join-in intention information, the variety of information processed at a time of the pre-join-in process, the variety of information processed at a time of the during-join-in process are input. Regarding the details of the join-in send-out process and the join-in reception process, description is provided later with reference to FIG. 5 and the like.

The departure processor 15 performs a departure send-out process and a departure reception process, as shown in FIG. 4. The departure processor 15 outputs the post-departure platoon information, the variety of information processed at a time of a pre-departure process, the variety of information processed at a time of a during-departure process, the drive information for the travel system component 80, and the like. To the departure processor 15, the self-vehicle departure intention information, the other vehicle departure intention information, the variety of information processed at a time of the pre-departure process, the variety of information processed at a time of the during-departure process are input. Regarding the details of the departure send-out process and the departure reception process, description is provided later with reference to FIG. 10 and the like.

The output part 16 is connected to the travel system component 80, and outputs, to the travel system component 80, the drive information from the manager 13, the join-in processor 14, and the departure processor 15, for providing a brake instruction, a deceleration instruction, and the like.

Here, the processing operation (i.e., the platoon travel control) of the ECU 10 is explained with reference to FIGS. 5 to 15. Further, please also refer to FIG. 3 and FIG. 4, together with the flowchart to be explained in the following regarding the processing operation.

Figure 9:
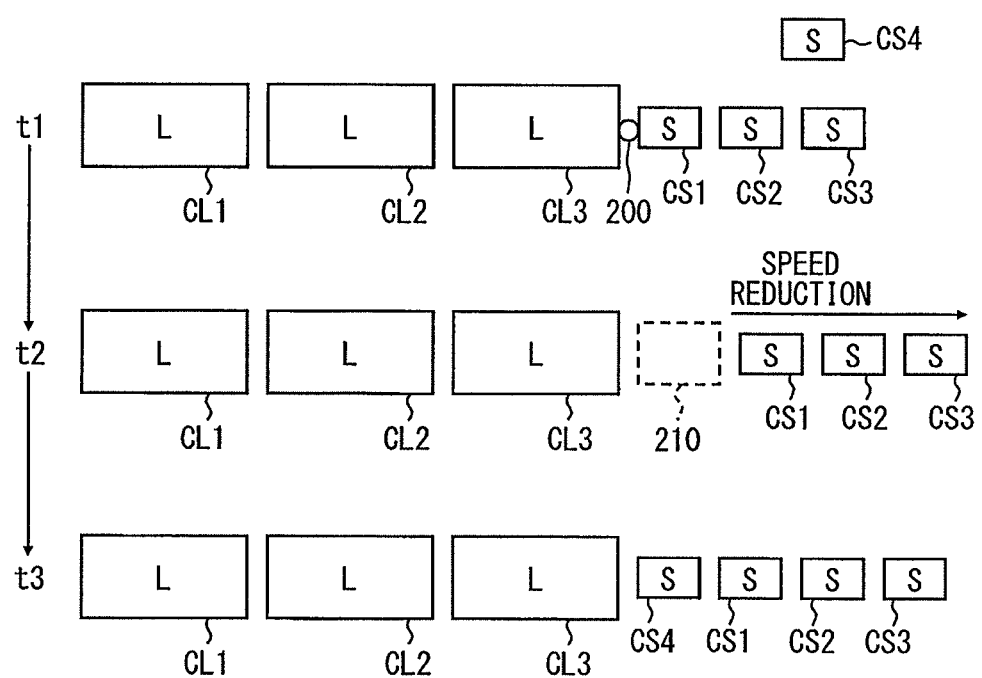
FIG. 9 is an illustration of vehicle behaviors at a time of joining in the platoon that includes two different types of vehicle groups.

First, processing of the ECU 10 at a time of join-in (i.e., a join-in process) is explained with reference to FIGS. 5 to 9. The platoon described in the present embodiment includes, as shown in FIG. 8, the large-size vehicle group (i.e., the first vehicle group) containing three large-size vehicles CL1-CL3 and the small vehicle group (i.e., the second vehicle group) containing three small-size vehicles CS1-CS3. In the following, as shown in FIG. 9, a situation is described as an example in which a small-size vehicle CS4 shows an intention of join-in and the join-in of the small-size vehicle CS4 is already permitted. In other words, in this example, the small-size vehicle CS4 is equivalent to the joining vehicle. Therefore, the vehicle CS4 may be designated as a joining vehicle CS4 hereafter.

Figure 5A:
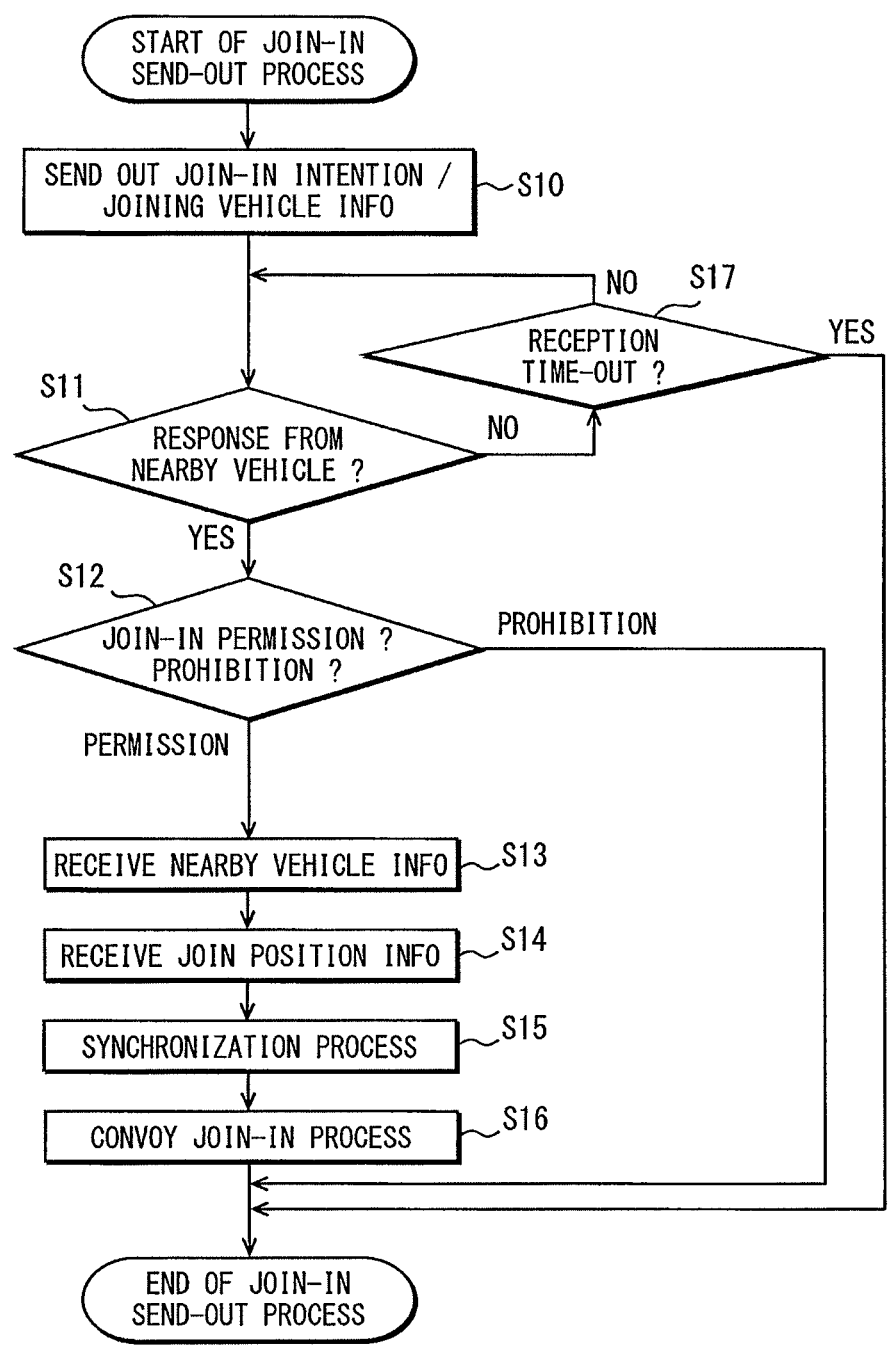
FIGS. 5A/B are flowcharts of join-in related processes by the platoon travel controller.

Steps S10-S17 in FIG. 5A show a join-in send-out process which is performed by the join-in processor 14. When the self-vehicle join-in intention information is input via the input part 12 from the user interface 60, the join-in processor 14 considers and acknowledges that such information is an intention to join in the platoon, and performs the join-in send-out process. Thus, this join-in send-out process is a processing which is performed by the join-in processor 14 of the ECU 10 that is disposed in a vehicle or in vehicles which will join in the platoon from now. In an example of FIG. 9, the process is performed by the join-in processor 14 of the ECU 10 in the joining vehicle CS4.

Figure 5B:
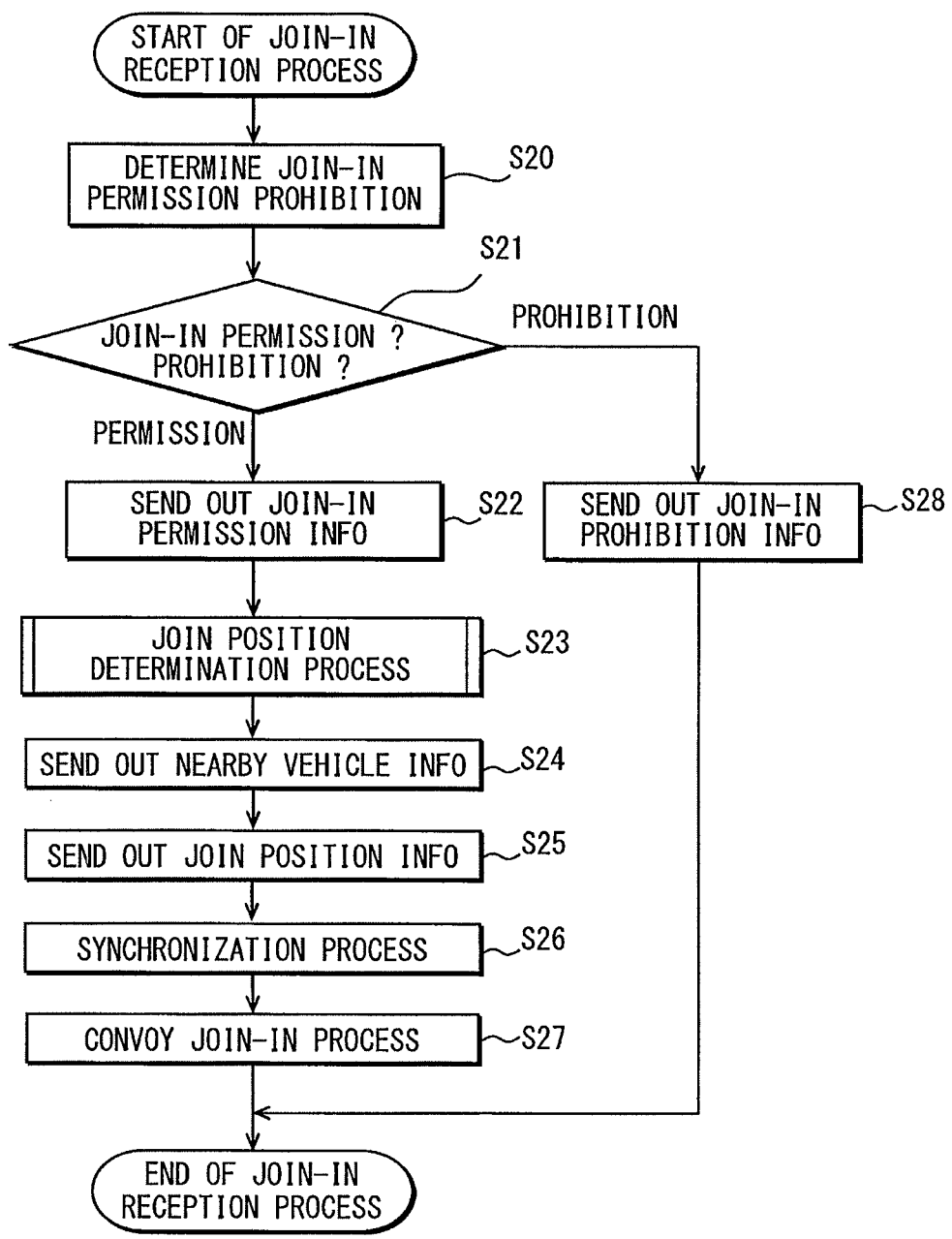

On the other hand, Steps S20-S28 in FIG. 5B show a join-in reception process which is also performed by the join-in processor 14. When the other vehicle join-in intention information is input via the antenna 21, the communication device 20, and the communication part 11, the join-in processor 14 considers/acknowledges that there is a vehicle which would like to join in the platoon, and performs the join-in reception process. Thus, this join-in reception process is a processing which is performed by the join-in processor 14 of the ECU 10 in the platoon vehicles. In an example of FIG. 9, the process is performed by the join-in processor 14 of the ECU 10 that is disposed in each of the large-size vehicles CL1-CL3 and the small-size vehicles CS1-CS3. Further, the variety of information in the pre-join-in process (i.e., D-info) which is output from the communication part 11 to the join-in processor 14 in FIG. 3 includes the other vehicle join-in intention information (C-info).

In Step S10, the join-in processor 14 sends out join-in intention and join-in vehicle information. That is, the join-in processor 14 transmits, via the communication part 11, the communication device 20, and the antenna 21, (i) the join-in intention information indicating a join-in intention and (ii) the vehicle information of the self-vehicle which serves as the join-in vehicle information. Therefore, the variety of information in the pre-join-in process (i.e., D-info), which is output from the join-in processor 14 to the communication part 11 in FIG. 3, includes the join-in intention information and the vehicle information.

A join-in permission prohibition determination is made in Step S20 (i.e., a join-in permission prohibition determination unit in the claims). At such time, the join-in processor 14 makes a join-in permission prohibition determination based on a depart point of the joining vehicle and a depart point of each of the platoon vehicles. Then, the join-in processor 14 determines whether a depart point of the joining vehicle is within a preset range from a depart point of each of the platoon vehicles. Then, if the depart point of the joining vehicle is within a preset range, it is determined that the join-in is permitted, and the process proceeds to Step S22, and, if the depart point is not in a preset range, the join-in processor 14 determines that the join-in is prohibited, and the process proceeds to Step S28. In the above, the join-in processor 14 can grasp a depart point of the joining vehicle based on the vehicle information from the joining vehicle, and can grasp a depart point of each of the platoon vehicles based on the platoon information.

The farther the depart points of the platoon vehicles are, the longer (i.e., so in terms of time) the platoon is organized and maintained. Therefore, by permitting a vehicle to join in the platoon only when a depart point of the joining vehicle is within a preset range with reference to a depart point of each of the platoon vehicles, the platoon can be organized and maintained for a long time. Further, by maintaining the platoon for a long time, the energy consumption of the whole platoon can be reduced for a long time.

Further, the join-in processor 14 may be configured to make the join-in permission prohibition determination based on the number of platoon vehicles. Then, if it is determined by the join-in processor 14 that the number of the platoon vehicles has currently reached a preset value (i.e., is equal to or greater than a specified number), the join-in processor 14 prohibits the join-in and the process proceeds to Step S28, and, if it is determined that the number of the present platoon vehicles has not reached a preset value (i.e., below a specified number), the join-in processor 14 permits the join-in, and the process proceeds to Step S22. The join-in processor 14 can grasp the current number of the platoon vehicles based on the information in the platoon information which shows (i) the number of vehicles in the first vehicle group and (ii) the number of vehicles in the second vehicle group.

In other words, the platoon travel system restricts the number of platoon vehicles. That is, by restricting the number of platoon vehicles, interference of the platoon vehicles with other (i.e., non-platoon) vehicles even when a platoon travel is organized as a train of vehicles with a certain inter-vehicle distance interposed in between the platoon vehicles.

In Step S21, it is determined whether the join-in is permitted or prohibited based on the result of determination in Step S20. When it is determined that the join-in is permitted, the process proceeds to Step S22, and, when it is determined that the join-in is prohibited, the process proceeds to Step S28 under control of the join-in processor 14.

In Step S22, join-in permission information which shows a join-in permission to the platoon is sent to the vehicles which have sent out the join-in vehicle information. At such time, the join-in processor 14 sends out the join-in permission information via the communication part 11, the communication device 20, and the antenna 21. The join-in processor 14 may also be configured to send out the platoon information regarding the current platoon including such oin-in permission information. On the other hand, in Step S28, the join-in prohibition information which shows a prohibition of join-in to the platoon is sent to the vehicle which has sent out the join-in vehicle information. At such time, the join-in processor 14 sends out the join-in prohibition information via the communication part 11, the communication device 20, and the antenna 21. Thus, in FIG. 3, the variety of information in the pre-join-in process (i.e., D-info) output from the join-in processor 14 to the communication part 11 includes the join-in permission information and the join-in prohibition information.

In Step S11, whether a response from the nearby vehicles exists or not is determined. The join-in processor 14 determines if a response from the nearby vehicles exists based on whether the join-in permission information or the join-in prohibition information sent out in above-mentioned Step S22 or Step S28 has been received. When the join-in permission information or the join-in prohibition information has been received via the communication part 11, the communication device 20, and the antenna 21, the join-in processor 14 determines that a response from the nearby vehicles exists, and the process proceeds to Step S12. On the other hand, when the join-in permission information or the join-in prohibition information has not been received, the join-in processor 14 determines that a response from the nearby vehicles does not exist, and the process proceeds to Step S17. Thus, in FIG. 3, the variety of information in the pre-join-in process (i.e., D-info) output from the communication part 11 to the join-in processor 14 includes the join-in permission information and the join-in prohibition information.

In Step S17, it is determined whether it is a reception time-out. The join-in processor 14 determines whether it is a reception time-out based on whether a preset time has passed after the transmission of the join-in intention information and the vehicle information in Step S10. In other words, the join-in processor 14 determines whether it is a reception time-out based on whether a response from one of the nearby vehicles has arrived in a preset time, after transmitting the join-in intention information and the vehicle information in Step S10.

When it is determined that the preset time has not passed yet after transmitting the join-in intention information and the vehicle information, it is determined that it is not yet a reception time-out, and the process returns to Step S11, or, when it is determined that the preset time has already passed after transmitting the join-in intention information and the vehicle information, it is determined that it is a reception time-out now to conclude the join-in send-out process. These Step S11 and S17 may be omitted.

In Step S12, it is determined whether the join-in is permitted or the join-in is prohibited. The join-in processor 14 determines, based on whether the join-in permission information or the join-in prohibition information has been received from the nearby vehicles, whether the join-in to the platoon is permitted or the join-in to the platoon is prohibited. The join-in processor 14 determines, when the join-in permission information has been received, that the join-in to the platoon is permitted, and the process proceeds to Step S13, or determines, when the join-in prohibition information has been received, that the join-in to the platoon is prohibited, and concludes the join-in send-out process.

On the other hand, the ECU 10 (i.e., the join-in processor 14) of the vehicles in the platoon (i.e., platoon vehicles) performs a join position determination process shown in Step S23, after sending out the join-in permission information in Step S22. Here, the join position determination process is explained with reference to FIG. 6 and FIG. 7.

The joining vehicle projection area is acquired in Step S30 (i.e., a first acquisition unit in the claims). The join-in processor 14 acquires the information which shows the projection area contained in the received join-in vehicle information. In other words, the join-in processor 14 acquires the information which shows a projection area of a vehicle which was permitted to join in the platoon in Step S21. Still in other words, the join-in processor 14 acquires the information which shows a projection area of a vehicle having the join-in intention to join in the platoon. Here, the ECU 10 has the platoon information. Therefore, the join-in processor 14 has already acquired the information of the projection area of each of the platoon vehicles in the platoon.

The process in Step S31 computes a join-in group of the joining vehicle (i.e., a grouping unit in the claims). The join-n processor 14 computes the join-in group of the joining vehicle based on the projection area of the joining vehicle and a reference value (i.e., the first range, the second range). In other words, the join-in processor 14 computes the join-in group of the joining vehicle based on (i) the projection area of the joining vehicle and (ii) the projection area of each of the platoon vehicles in the current platoon.

In the examples of FIG. 8 and FIG. 9, the join-in processor 14 computes the join-in group of the joining vehicle CS4 based on (i) the projection area of the joining vehicle CS4 and (ii) the projection area (i.e., the first range, the second range) of the large-size vehicles CL1-CL3 and the small-size vehicles CS1-CS3 each of which is the platoon vehicle in the current platoon. In this case, the joining vehicle CS4 is a small-size vehicle. Therefore, the projection area of the joining vehicle CS4 is in the second range. Thus, the join-in processor 14 computes the join-in group of the joining vehicle CS4 as the second vehicle group. In other words, the join-in processor 14 determines the join-in group of the joining vehicle CS4 as the second vehicle group.

The process in Step S32 acquires a depart point of the joining vehicle (i.e., a second acquisition unit in the claims). The join-in processor 14 acquires the information which shows a depart point of the joining vehicle via the navigation device 30 and the input part 12 which is disposed in the self-vehicle. In other words, the navigation device 30 computes a depart point of the joining vehicle based on the guidance route of the joining vehicle included in the join-in vehicle information received based on the joining vehicle and the travel route of the platoon contained in the platoon information on the current platoon. The navigation device 30 then outputs the information which shows a computed depart point of the joining vehicle to the ECU 10.

Further, the join-in processor 14 may acquire, via the communication part 11, the communication device 20, and the antenna 21 (i.e., a second acquisition unit in the claims), the information which shows a depart point which is computed by the joining vehicle. In such case, it is assumed that the join-in processor 14 of one of the platoon vehicles has sent out the platoon information of the current platoon together with the join-in permission information (to the joining vehicle). On the other hand, the ECU 10 of the joining vehicle outputs the travel route of the platoon contained in the platoon information to the navigation device 30, when the ECU 10 has received the platoon information. The navigation device 30 disposed in the joining vehicle computes a depart point of the self-vehicle based on the guidance route of the self-vehicle and the travel route of the platoon. Then, the ECU 10 of the joining vehicle acquires the information which shows a depart point from the navigation device 30 of the self-vehicle, and transmits the information which shows the depart point to the platoon vehicles via the communication device 20 and the antenna 21. In such manner, the join-in processor 14 may acquire a depart point of the joining vehicle computed by the joining vehicle via the communication part 11, the communication device 20, and the antenna 21.

Further, the ECU 10 of the joining vehicle may be configured to transmit, to the platoon vehicles, the information which shows a depart point that has been output from the user interface 60. Even in such manner, the join-in processor 14 can acquire a depart point which was computed by the joining vehicle via the communication part 11, the communication device 20, and the antenna 21. Therefore, in FIG. 3, the variety of information in the pre-join-in process that has been output from the communication part 11 to the join-in processor 14 may include the information which shows the depart point.

In Step S33, the process acquires a number 'm' of vehicles in the join-in group. That is, the join-in processor 14 acquires, from the platoon information, the number of the join-in group into which the joining vehicle is joining. In an example of FIG. 9, the join-in group of the joining vehicle CS4 is the second vehicle group. Therefore, the number m of vehicles in the join-in group is set to 3. Further, the depart point of the joining vehicle CS4 is the point E.

In Step S34, the process performs a depart-point-specific join position determination process. Here, the depart-point-specific join position determination process is explained with reference to FIG. 7. The depart-point-specific join position determination process is a processing which compares a depart point of the joining vehicle with a depart point of each of the vehicles contained in the join-in group, and determines a join position of the joining vehicle in the join-in group. Therefore, a join position is eventually determined by this depart-point-specific join position determination process. Therefore, the depart-point-specific join position determination process may also be referred to as a final position determination process (i.e., a final position determination unit in the claims).

In Step S40, the process sets a value of 'n' to 1 (i.e., to an initial value). This value of 'n' shows respective position of the vehicles in each group (i.e., 'n' shows an order of the vehicle in the group). However, the meaning of 'n' is different in the first vehicle group and in the second vehicle group. As shown in FIG. 8, 'n' indicates that the vehicle is in the 'n'-th order from the top vehicle of the group in the first vehicle group, while, in the second vehicle group, the vehicle is in the 'n'-th order from the tail end vehicle of the group. That is, in the first vehicle group, n=1 is the large-size vehicle CL1, n=2 is the large-size vehicle CL2, and n=3 is the large-size vehicle CL3. On the other hand, in the second vehicle group, n=3 is the small-size vehicle CS1, n=2 is the small-size vehicle CS2, and n=1 is the small-size vehicle CS3.

The value of 'n' in Step S40 is set to 1 which is an initial value when performing the final position determination process for the first time. However, when performing the same process for the second time and further, the value of 'n' is set in Step S44 that is explained later.

In Step S41, the process determines whether a depart point of the joining vehicle is the same as the depart point of the n-th vehicle, or nearer than the depart point of the n-th vehicle. When the join-in processor 14 determines that a depart point of the joining vehicle is the same as or nearer than the depart point of the n-th vehicle, the process proceeds to Step S42, or, when it does not determine that a depart point of the joining vehicle is the same as or nearer than the depart point of the n-th vehicle, the process proceeds to Step S43.

That is, when the determination of Step S41 is performed for the first time, the value of n is equal to 1 (i.e., n=1). Therefore, a depart point of the joining vehicle is compared with a depart point of the n=1 vehicle. When a depart point of the joining vehicle is the same as or nearer than a depart point of the n=1 vehicle, the process proceeds to Step S42. When a depart point of the joining vehicle is not same or nearer than that of the n=1 vehicle, i.e., when a depart point of the joining vehicle is farther than that of the n=1 vehicle, the process proceeds to Step S43. In such configuration, the depart point of the n=1 vehicle is the nearest point relative to the current position of the platoon among the vehicles in the same group in the platoon.

Further, for the determination of Step S41 for the second time or later, the value of 'n' is being set either to 2, 3, 4 and the like by the process in Step S44, which is explained later.

In Step S42, the process determines the n-th position as a join position. When the first-time determination of Step S41 yields YES, a n=1 position is determined as the join position. When the second-time determination of Step S41 yields YES, an n=2 position is determined as the join position. The join position is determined in the same manner for the determination of n=3 and further.

Figure 6:
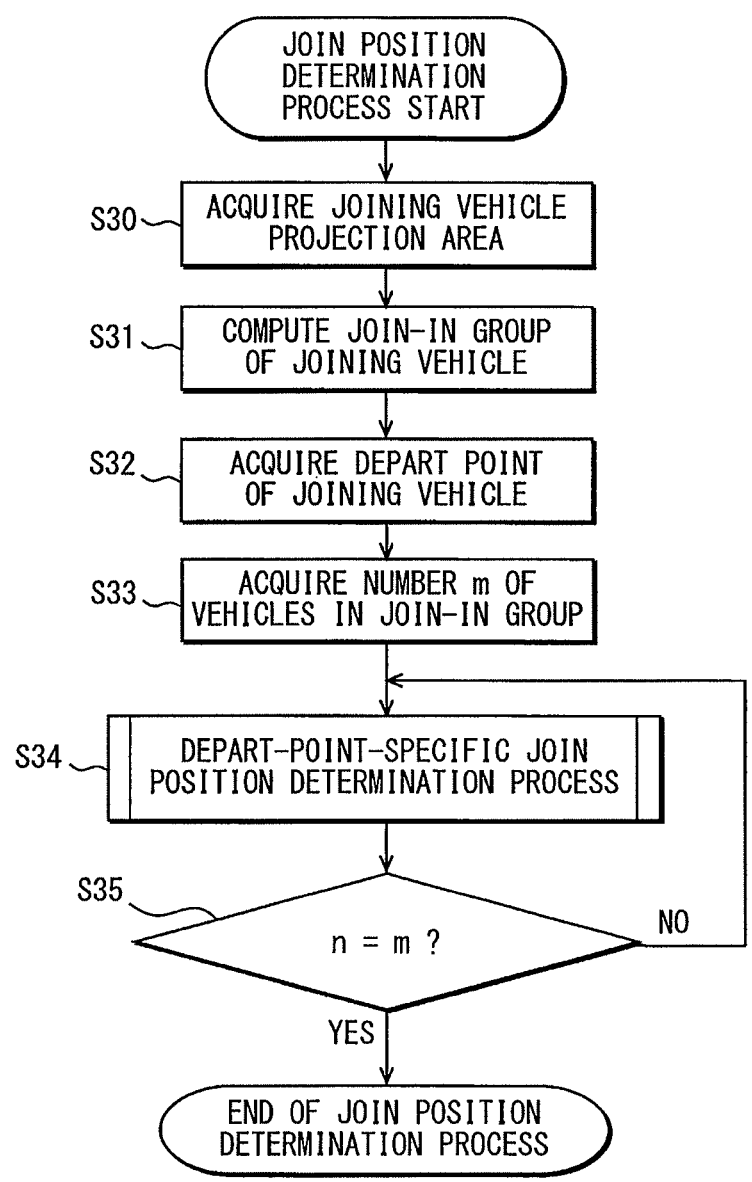
FIG. 6 is a flowchart of a position determination process by the platoon travel controller.
Figure 7:
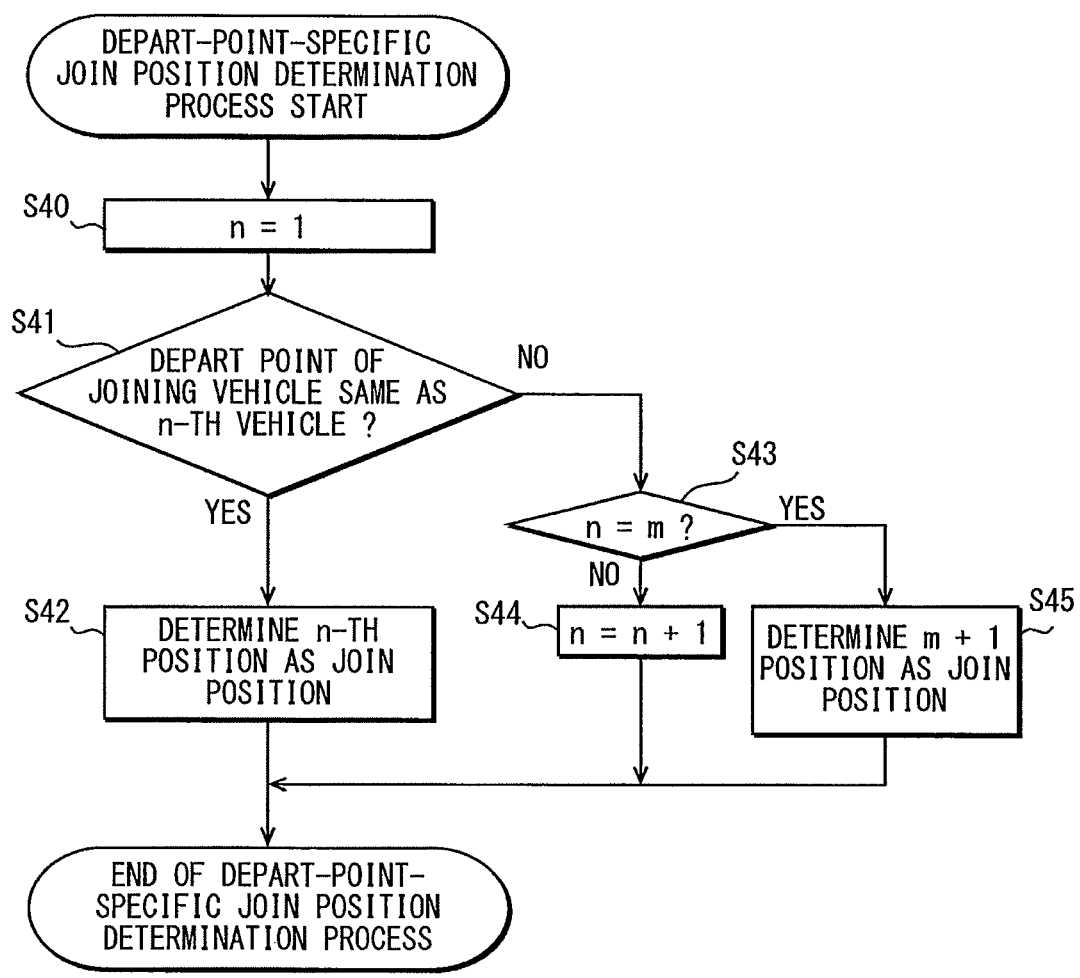
FIG. 7 is a flowchart of a depart point specific position determination process by the platoon travel controller.

After the end of processing in Step S42, the process proceeds to Step S35 of the flowchart of FIG. 6. In Step S35 of FIG. 6, it is determined whether n=m. When it is determined that n=m, the join position determination process is finished, and, when it is determined that n≠m, the process returns to Step S34. In other words, when the comparison of a depart point of the joining vehicle with a depart point of all the vehicles in the join-in group has been finished (i.e., when n=m), the join position determination process is finished, and, when the comparison has not been finished (i.e., when n≠m), the process returns to Step S34.

Further, the determination of Step S35 may alternatively be a determination whether the join position has already been determined. In other words, when it is determined in Step S35 that the join position has been determined, the join position determination process may be finished, and, when it is determined in Step S35 that the join position has not been determined, the process may return to Step S34. Therefore, when determining Step S35 after Step S42 or S45, the determination in Step S35 becomes YES, and the join position determination process is finished. On the other hand, when determining Step S35 after Step S44, the determination in Step S35 becomes NO, and the process returns to Step S34.

In Step S43, the process determines whether n=m. When it is determined that n=m, the process proceeds to Step S45, and, when it is determined that n≠m, the process proceeds to Step S44.

In Step S44, the final position determination process is finished as n=n+1. In other words, in this step S44, the value of n for performing the final position determination process for the next time is set up. After the end of processing in Step S44, the process proceeds to Step S35 of the flowchart of FIG. 6. Since n≠m after processing in Step S44, the determination in Step S35 becomes NO. Therefore, the final position determination process will be performed again.

In Step S45, an m+1 position is determined as a join position. After the end of processing in Step S45, the process proceeds to Step S35 of FIG. 6. Since n=m after processing in Step S45, the determination in Step S35 becomes YES. Therefore, the join position determination process will be finished.

Here, the final position determination process is explained based on an example shown in FIG. 9. In this example, the n=1 vehicle in the join-in group into which the joining vehicle CS4 is joining is the small-size vehicle CS3. The depart point of the small-size vehicle CS3 is the point B. On the other hand, the depart point of the joining vehicle CS4 is the point E. Therefore, when the final position determination process is performed for the first time, the determination in Step S41 becomes NO. Further, in Step S43, since n≠3, the determination becomes NO. Then, in Step S44, the final position determination process is finished as n=n+1.

Now, when the final position determination process is performed for the second time, the n=2 vehicle is the small-size vehicle CS2. The depart point of the small-size vehicle CS2 is the point C. Therefore, in Step S41, the determination becomes NO. In Step S43, since n≠3, the determination becomes NO. Then, in Step S44, the final position determination process is finished as n=n+1.

Further, when the final position determination process is performed for the third time, the n=3 vehicle is the small-size vehicle CS1. The depart point of the small-size vehicle CS1 is the point D. Therefore, in Step S41, the determination becomes NO. In Step S43, since n is set to 3, the determination becomes YES. Then, in Step S45, the n-th position (i.e., an m+1 position) is determined as a join position, and the final position determination process is finished. As shown at timing t1 of FIG. 9, a join position 200 of the joining vehicle CS4 is determined as the position of m+1, i.e., the position in front of CS1.

Although not illustrated, when a large-size vehicle joins in the platoon, processing of joining is performed similarity. That is, when a large-size vehicle whose depart point is the point A would like to join in the platoon of FIG. 8 may be performed as follows. In such case, in Step S31, the first vehicle group is computed as the join-in group. Then, processing of Step S32 and S33 is performed.

Then, the final position determination process of Step S34 is performed. That is, when the final position determination process is performed for the first time, an n=1 vehicle is the large-size vehicle CL1. The depart point of the large-size vehicle CL1 is the point B. On the other hand, the depart point of the joining vehicle is the point A. Therefore, in Step S41, the determination becomes YES. Therefore, the n=1 position is determined as a join position. In other words, the position of the large-size vehicle CL1 in the current platoon is determined as a join position.

The join-in processor 14 of each of the platoon vehicles updates the platoon information that is held in itself, for an update of the determined join position of the joining vehicle, the number of vehicles in each of the vehicle groups, the travel route of the platoon, and the like, when the join position determination process is finished. That is, each of the platoon vehicles updates the platoon information. Thus, all platoon vehicles in one platoon hold the same platoon information. However, the ECU 10 in each of the platoon vehicles may be processing error or the like. That is, when processing error or the like is caused in one ECU 10, the platoon information may become different vehicle to vehicle (i.e., ECU 10 to ECU 10). Therefore, the join-in processor 14 in each of the platoon vehicles may be configured to transmit the updated platoon information to the other platoon vehicles via the communication part 11, the communication device 20, and the antenna 21. Then, it is determined in the ECU 10 in each of the platoon vehicles whether the platoon information held in the ECU 10 is the same as the platoon information received from the other platoon vehicles by the comparison of the two pieces of platoon information (e.g., based on majority vote or the like). When it is determined that the platoon so information in one ECU 10 does not match the received platoon information, that ECU 10 may update the platoon information held therein by using the received platoon information from the other platoon vehicles (i.e., by using a "seem-to-be-correct" platoon information). In the above-described manner, the same platoon information is held in all platoon vehicles. Such a transmission and an update of the platoon information may be performed at any timing after the completion of the join position determination process.

After the end of the join position determination process, processing of Step S24 of FIG. 5B and thereafter is performed. In Step S24, the process sends out the nearby-vehicle information. That is, the join-in processor 14 in the platoon vehicle transmits the vehicle information of the self-vehicle to the joining vehicle via the communication part 11, the communication device 20, and the antenna 21.

Corresponding to this Step S24, the process in Step S13 receives the nearby-vehicle information. That is, the join-in processor 14 of the joining vehicle receives the nearby-vehicle information transmitted from the platoon vehicles via the antenna 21, the communication device 20, and the communication part 11.

In Step S25, join position information is sent out. That is, the join-in processor 14 of at least one of the platoon vehicles transmits the join position information to the joining vehicle via the communication part 11, the communication device 20, and the antenna 21. Therefore, the variety of information in the pre-join-in process in FIG. 3 includes this join position information. The join position information is information which shows the position where the joining vehicle is put in the platoon.

Corresponding to this Step S25, the join position information is received in Step S14. The join-in processor 14 of the joining vehicle receives the join position information transmitted based on platoon vehicles via the antenna 21, the communication device 20, and the communication part 11.

The join position information may be any information as long as the information can notify the vehicle occupant of the join position of the joining vehicle. For example, the join position information may be the information which shows in what position the joining vehicle is to join in the platoon (e.g., n-th position determined in FIG. 7). At such time, if the joining vehicle has already acquired the platoon information, the information which shows the join-in group and an 'n' value may be used as the join position information.

In Step S15 and Step S26, the joining vehicle and the platoon vehicles respectively perform a synchronization process. This synchronization process is a processing which synchronizes the joining vehicle and the platoon vehicles, for the join-in of the joining vehicle into the platoon. The join-in processor 14 of the joining vehicle and the join-in processor 14 in each of the platoon vehicles synchronize with each other via the antenna 21, the communication device 20, and the communication part 11 which are disposed in each of those vehicles, for performing a platoon join-in process that is to be performed in the next step.

In Steps S16 and Step S27, each of the joining vehicle and the platoon vehicles performs the platoon join-in process (i.e., a first drive unit in the claims). Here, the platoon join-in process is explained with reference to an example of FIG. 9. In the example of FIG. 9, at timing t1, the join position 200 is determined as the position currently occupied by the small-size vehicle CS1. In other words, it is determined as a position between the large-size vehicle CL3 and the small-size vehicle CS1.

In the example of this FIG. 9, the join position 200 is not the top or the tail end of the platoon. In such a case, for the joining of the joining vehicle CS4, it is necessary to provide a join-in space 210 between the vehicles before and behind the join position 200. Then, as shown at timing t2, the small-size vehicles CS1-CS3 which are the platoon vehicles behind the join position 200 are slowed down, for the reservation of the join-in space 210 (i.e., speed reduction control). At such time, the join-in processor 14 disposed in each of the small-size vehicles CS1-CS3 outputs, to the travel system component 80 via the output part 16, the drive information which shows/ instructs slowing down at a constant rate (i.e., a first drive unit in the claims). After slowing down and a reservation of the join-in space 210, the small-size vehicles CS1-CS3 will accelerate at a constant rate for resuming the travel at a pre-slowdown speed.

Thus, after the reservation of the join-in space 210, as shown at timing t3, , the joining vehicle CS4 will go into the join-in space 210. At such time, the join-in processor 14 disposed in the joining vehicle CS4 outputs, to the travel system component 80 via the output part 16, the drive information which shows/instructs a move of CS4 from a pre-join position to the join-in space 210.

In other words, joining of a new vehicle is achieved by (i) gradually slowing down the "behind" vehicles behind the oin position 200 for the reservation of the join-in space 210, which is a space required for the joining vehicle, and (ii) gradually accelerating, at a near-completion time of the reservation of the space 210, to resume the travel at an original (i.e., pre-slowdown) speed, and, during such a period, the joining vehicle moves into the reserved join-in space 210 and the platoon is re-organized. In the above-described manner, the joining of a new vehicle is achieved without accelerating the "in-front" vehicles in front of the join position 200, thereby preventing an increase of the travel resistance of the in-front vehicles and also preventing deterioration of the energy consumption (i.e., a decrease of the fuel mileage) by those vehicles.

Further, the platoon join-in process of the present embodiment, which is in the above described as being performed by the joining vehicle and the "behind" platoon vehicles behind the join position, may also be performed by the joining vehicle and all platoon vehicles in front and behind the join position. In such a case, the join-in space 210 may be reserved by accelerating the platoon vehicles in front of the join position 200 and by decelerating the platoon vehicles behind the join position 200. In such manner, the join-in space 210 is more quickly reserved than by decelerating the behind vehicles only. Therefore, in such manner, a platoon collapse time during which the platoon is being collapsed is reduced.

Further, the platoon join-in process of the present disclosure may be performed by the joining vehicle and the platoon vehicles in front of the join position. In such a case, the join-in space 210 may be reserved by accelerating the platoon vehicles in front of the join position 200.

Thus, the platoon travel system organizes, based on the projection area of the vehicles, larger projection area vehicles as a top group and smaller projection area vehicles as a tail end group. Then, when the platoon travel system accepts a joining vehicle to the platoon, the system determines the join-in group of the joining vehicle based on the projection area of the joining vehicle, and determines a join position of the joining vehicle based on a depart point of the joining vehicle and a depart point of each of the vehicles contained in the join-in group.

Further, the platoon travel system determines the position of each of the plural vehicles in each vehicle group based on the depart point information. More specifically, the platoon travel system determines, as for the first vehicle group that is a top group of the platoon, the join position of the joining vehicle to be closer to the top/front of the group/platoon for a vehicle having a nearer depart point, which may also be stated a closer-to-front-most position relative to a travel direction of the platoon. That is, in the top group of the platoon, the vehicles are positioned in an ascending order of a depart point distance from the top of the platoon.

On the other hand, in the second vehicle group that is a tail end group of the platoon, the platoon travel system determines the join position of the joining vehicle to be closer to the tail end of the platoon for a vehicle having a nearer depart point, which may also be stated a closer-to-rear-most position relative to the travel direction of the platoon. That is, in the tail end group of the platoon, the vehicles are positioned in a descending order of a depart point distance from the top of the group. That may still be re-stated that the vehicles are positioned in an ascending order of a depart point distance from the tail end of the group.

In such manner, the platoon travel system in the present embodiment enables the platoon to have a departing platoon vehicle either departing from the top of the platoon or from the tail end of the platoon. Regarding the depart point distance, a near depart point means that the depart point is near/close to the current position of the vehicle/platoon. Therefore, the near depart point may be re-stated that the travel distance from the current position to the depart point is short.

In the above, a situation of accepting/joining a joining vehicle has been described as an example. However, the flow-charts of FIGS. 5A-7 may also be applied to a formation/ organization of a new platoon. For example, when a new platoon is organized as the one shown in FIG. 8, those flowcharts are applicable. In such a case, the join-in processor 14 disposed in each of the plural vehicles that would like to perform a platoon travel performs both of the above-mentioned join-in send-out process and the join-in reception process. In such manner, the platoon travel system positions the vehicles having nearer depart points to be closer to the top of the platoon in the first vehicle group that is a top group of the platoon, and also positions the vehicles having nearer depart points to be closer to the tail end of the platoon in the second vehicle group that is a tail end group of the platoon. As a result, the platoon travel system can newly organize a platoon as shown, for example, in FIG. 8.

In other words, if a platoon is considered as a whole, from the top part toward the middle part of the platoon, vehicles are positioned so that depart points of the vehicles become farther step by step (i.e., vehicle by vehicle), and, from the tail end toward the middle part of the platoon, vehicles are also positioned so that depart points become farther step by step. Still in other words, the platoon organized by the platoon travel system of the present disclosure always makes the departing vehicle depart either from a top of the platoon or a tail end of the platoon.

Further, the above-described vehicle positioning, i.e., a nearer depart point vehicle is positioned closer to a top of the platoon in the first vehicle group that is a top group of the platoon and a nearer depart point vehicle is positioned closer to a tail end of the platoon in the second vehicle group that is a tail end group of the platoon, may be designated as an organization rule of the platoon. Therefore, it may be stated, in other words, that the platoon travel system organizes a platoon according to this organization rule.

Figure 10A:
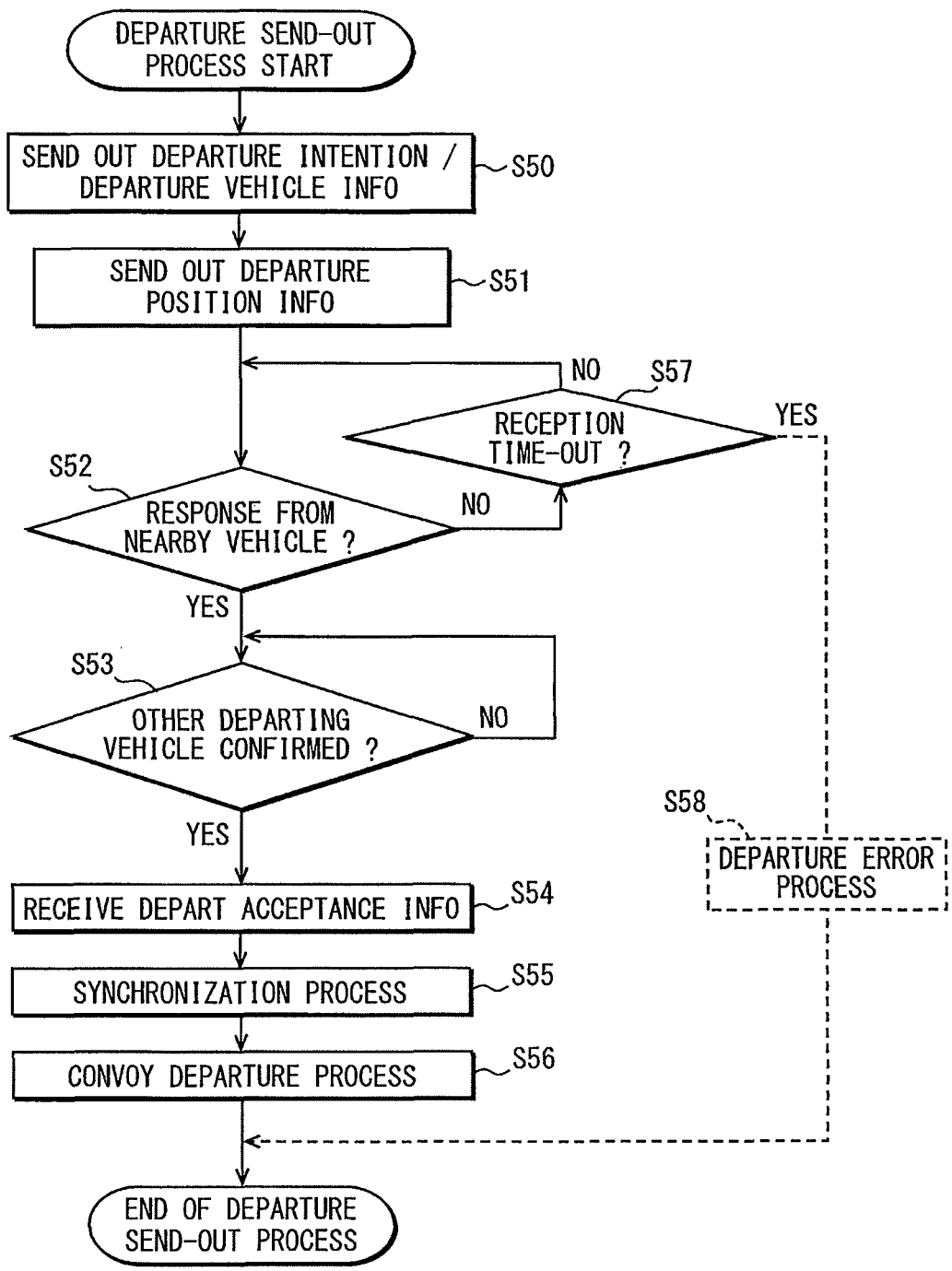
FIGS. 10A/B are flowcharts of departure related processes by the platoon travel controller.
Figure 10B:
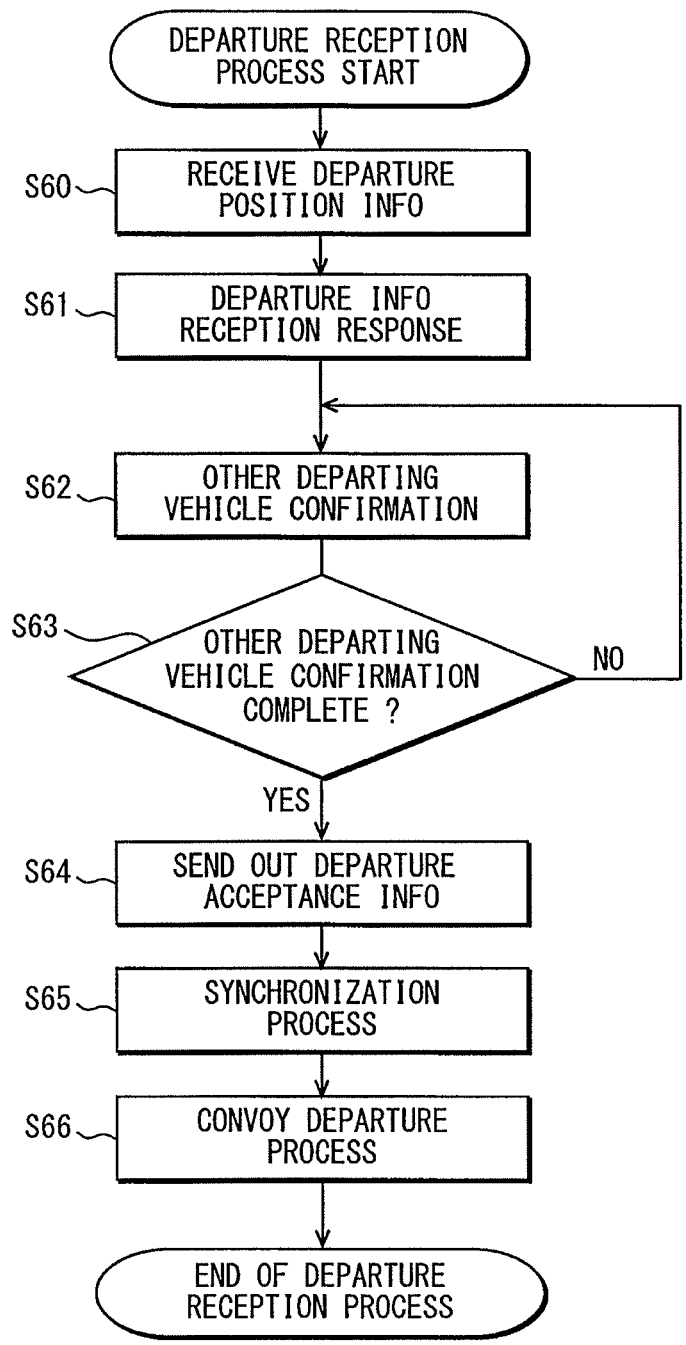
Figure 11:
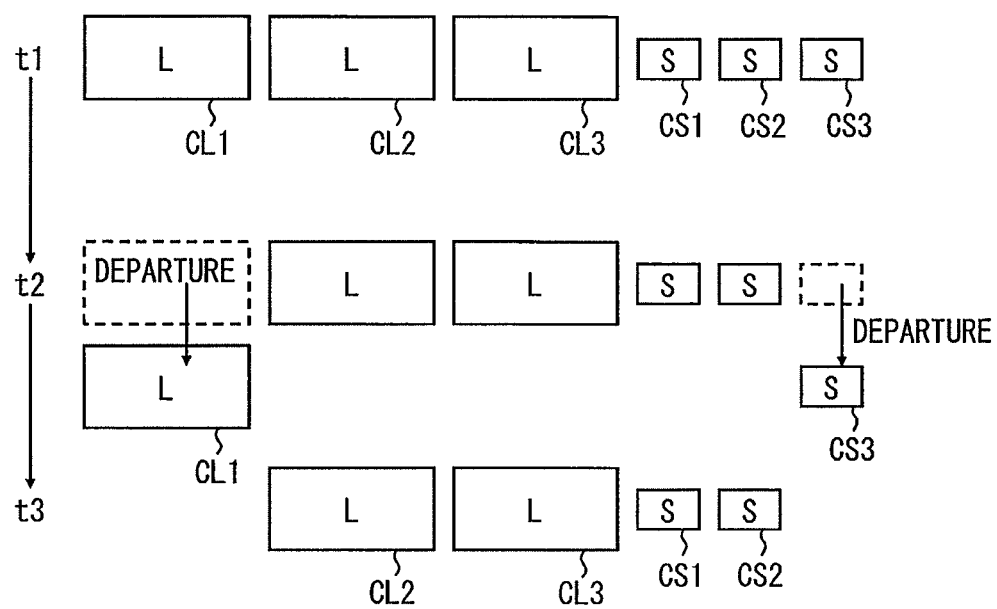
FIG. 11 is an illustration of vehicle behaviors at a time of departing from the platoon that includes two different types of vehicle groups.

Next, with reference to FIG. 8, FIG. 10, and FIG. 11, a depart time process of the platoon travel controller 10 is described. In this case, as shown in FIG. 11, an example in which the large-size vehicle CL1 and the small-size vehicle CS3 depart from a platoon of FIG. 8 is described.

Steps S50-S58 shown in FIG. 10A show the departure send-out process which is performed by the departure processor 15. When platoon departure intention information is input via the input part 12 from the user interface 60, the departure processor 15 considers/acknowledges that such information is an intention to depart from the platoon, and performs the departure send-out process. Thus, this departure send-out process is a processing which is performed by the departure processor 15 of the ECU 10 that is disposed in a vehicle or vehicles which depart from the platoon. Hereafter, vehicles which depart from the platoon may be designated as departing vehicles. In an example of FIG. 11, the departure send-out process is a processing which is performed by the departure processor 15 of the ECU 10 that is disposed in the large-size vehicle CL1 and the departure processor 15 of the ECU 10 disposed in the small-size vehicle CS3.

As an assumption, the navigation device 30 may be configured to calculate a remaining distance from the current position to a depart point at preset intervals, and, to output the platoon departure intention information when the remaining distance to a depart point reaches a preset value. In such a case, the departure processor 15 of the ECU 10 disposed in each of the platoon vehicles performs the departure send-out process, when the platoon departure intention information is input via the input part 12 from the navigation device 30.

On the other hand, Steps S60-S67 of FIG. 10B show the departure reception process which is performed by the departure processor 15. When other vehicle departure intention information is input via the antenna 21, the communication device 20, and the communication part 11, the departure processor 15 considers/acknowledges that there is a vehicle which would like to depart from the current platoon, and performs the departure reception process. Thus, the departure reception process is a processing which is performed by the departure processor 15 of the ECU 10 that is disposed in platoon vehicles other than the departing vehicle. In the example of FIG. 11, the departure reception process is performed by the departure processor 15 of the ECU 10 in each of the large-size vehicles CL2, CL3, and the small-size vehicles CS1, CS2. Further, the variety of information in the pre-departure process is output to the departure processor 15 from the communication part 11 in FIG. 3 includes the other vehicle departure intention information. Further, vehicles other than the departing vehicle, which may be designated hereafter as non-departing vehicles, remain in the platoon after the departing vehicle departs from the platoon.

In Step S50, the departure processor 15 sends out a departure intention and departure vehicle information. That is, the departure processor 15 transmits, via the communication part 11, the communication device 20, and the antenna 21, (i) the departure information which shows a departure intention and (ii) the vehicle information of the self-vehicle as the departure vehicle information. Therefore, the variety of information in the pre-departure process output to the communication part 11 from the departure processor 15 in FIG. 3 includes this departure information and the vehicle information.

In Step S51, departure position information is sent out. That is, the departure processor 15 transmits, via the communication part 11, the communication device 20, and the antenna 21, the departure position information, i.e., the information which shows a position of the self-vehicle in the platoon. Therefore, the variety of information in the pre-departure process output to the communication part 11 from the departure processor 15 in FIG. 3 includes this departure position information.

In the example of FIG. 11, the departure processor 15 of the ECU 10 disposed in the large-size vehicle CL1 transmits the departure information, the vehicle information, and the departure position information (i.e., information which shows the n=1 position in the first vehicle group). The departure processor 15 of the ECU 10 disposed in the small-size vehicle CS3 transmits the departure information, the vehicle information, and the departure position information (i.e., information which shows the n=1 position in the second vehicle group).

Corresponding to the above, the departure processor 15 of the ECU 10 disposed in the non-departing vehicle performs processing of Step S60. That is, in Step S60, the departure position information is received. At such a time, the departure processor 15 receives the departure position information via the antenna 21, the communication device 20, and the communication part 11.

Then, in Step S61, the departure processor 15 responds to the departure information which has just been received. At such a time, the departure processor 15 sends out, to the departing vehicle, response information which shows that the departure information has been received via the communication part 11, the communication device 20, and the antenna 21. Thus, the variety of information in the pre-departure process output to the communication part 11 from the departure processor 15 in FIG. 3 includes this response information.

In Step S62, whether there is the other departing vehicle is confirmed. Then, in Step S63, when it is determined that there is a departing vehicle, the process returns to Step S62, and, when it is determined that there is no other departing vehicle, the process proceeds to Step S64. Although not illustrated, the departure processor 15 transmits, to the (original) departing vehicle via the communication part 11, the communication device 20, and the antenna 21, the above confirmation result of whether the other departing vehicle exists or not.

In a case of the multi-master method, the ECU 10 disposed in each of the platoon vehicles has the same information basically, and, through information exchange with the ECUs 10 in other platoon vehicles, the same information prevails instantaneously in one platoon. Therefore, when the departure information is sent out from one ECU 10 in a departing vehicle in the platoon, the ECU 10 in the other departing vehicle also sends out the departure information in synchronization with the departure information transmission from the original departing vehicle, thereby making it possible for the original departing vehicle to confirm whether there is the other departing vehicle in the platoon.

Further, if the platoon control is the multi-master method, the ECUs 10 in the platoon vehicles respectively have the depart point information of the other platoon vehicles. That is, the vehicles departing at the same depart point know each other in advance. In other words, the same point departing vehicle can be readily found and confirmed.

Further, in case that the platoon control is the master/slave method to be described later, the ECU 10 disposed in a master vehicle receives the departure information from the ECU 10 disposed in slave vehicles. Therefore, the other departing vehicle can be readily found and confirmed.

In Step S64, departure acceptance information is sent out. At such a time, the departure processor 15 sends out the departure acceptance information to a departing vehicle via the communication part 11, the communication device 20, and the antenna 21.

On the other hand, in Step S52, a response from a non-departing vehicle is determined. That is, the departure processor 15 determines a response from a non-departing vehicle based on whether the response information sent out in the above-mentioned Step S61 has been received. When the response so information has been received via the communication part 11, the communication device 20, and the antenna 21, the departure processor 15 determines that there is a response from a non-departing vehicle, and the process proceeds to Step S53. On the other hand, when the response information has not been received, the departure processor 15 determines that there is no response from a non-departing vehicle, and the process proceeds to Step S57. Thus, the variety of information in the pre-departure process output to the departure processor 15 from the communication part 11 in FIG. 3 includes this response information.

In Step S57, it is determined whether a situation is a reception time-out. That is, the departure processor 15 determines whether it is a reception time-out based on whether a preset time has passed after transmitting the departure information, the vehicle information, and the departure position information in Steps S50 and S51. In other words, the departure processor 15 determines whether it is a reception time-out based on whether a response from the nearby vehicle is received within a preset time after transmitting the departure intention and the departure vehicle information in Step S50. The departure processor 15 determines that it is not a reception time-out when a preset time has not yet passed after transmitting this information, and the process returns to Step S52, or it determines that it is a reception time-out when a preset time has passed already, and the process proceeds to Step S58.

In Step S58, the departure processor 15 performs a departure error process. Even after transmitting the departure information, the vehicle information, and the departure position information in Steps S50 and S51, there may be no response from the nearby vehicles. In such a case, it is considered as an abnormal platoon state, which makes it impossible to depart from the platoon normally. Thus, the departure processor 15 may stop the platoon travel, and may shift to a manual travel mode in the departure error process, for example. In other words, the processor 15 instructs a vehicle driver to depart from the platoon by performing an accelerator operation and/or a steering operation. These Steps S52, S57, and S58 may be omitted in some cases.

In Step S53, it is determined whether the other departing vehicle confirmation has been complete. At such a time, the departure processor 15 determines based on the confirmation result of the other departing vehicle transmitted from the non-departing vehicle. When it is determined that the other departing vehicle confirmation has been complete, the process proceeds to Step S54, and, when it is determined that the confirmation has not yet been complete, the determination in Step S53 will be repeated. In Step S54, the departure acceptance information is received. At such a time, the departure processor 15 receives the departure acceptance information via the antenna 21, the communication device 20, and the communication part 11.

In Steps S55 and Step S65, the departing vehicle and non-departing vehicles perform a synchronization process. This synchronization process is performed for a synchronization between the departing vehicle and non-departing vehicles, for the departure of a vehicle that would like to depart from the platoon. The departure processor 15 of the departing vehicle and the departure processor 15 in each of the non-departing vehicles synchronize with each other via the antenna 21, the communication device 20, and the communication part 11 which are disposed in each of those vehicles, for performing a platoon departure process.

In Steps S56 and Step S65, each of the departing vehicle and non-departing vehicles performs the platoon departure process. Here, this platoon departure process is explained with reference to the example of FIG. 11. In the example of FIG. 11, if the platoon arrives at the point B which is a depart point of the large-size vehicle CL1 and the small-size vehicle CS3 as shown in a row of timing t2, the large-size vehicle CL1 and the small-size vehicle CS3 departs from the platoon. As shown in a row of timing t3, the platoon after the departure of the large-size vehicle CL1 and the small-size vehicle CS3 is composed of the large-size vehicles CL2, CL3 and the small-size vehicles CS1, CS2.

As described above, the platoon is organized to have the departing vehicle to depart either from the top of the platoon or from the tail end of the platoon. Therefore, in the platoon departure process in Steps S56 and S65, the vehicle is controlled to depart from at least one of the top of the platoon or the tail end of the platoon. That is, in the present embodiment, a vehicle is enabled to depart from the top of the platoon or the tail end of the platoon as shown in FIG. 11.

After the completion of the platoon departure process, the departure processor 15 of each of the platoon vehicles updates the platoon information which is held therein, for reflecting, to the platoon information, a position of each vehicle, the number of vehicles in each of the vehicle groups and the like. In other words, after a departing vehicle has departed from the platoon, the departure processor 15 of a non-departing vehicle updates the platoon information. The updated platoon information may also be called the post-departure platoon information.

Further, the departure processor 15 of each of the platoon vehicles may be configured to transmit the updated platoon information to other platoon vehicle(s) via the communication part 11, the communication device 20, and the antenna 21 as mentioned above. Then, it may be determined by the ECU 10 of each of the platoon vehicles whether the platoon information held in each of the platoon vehicles matches the platoon information received from the other platoon vehicle(s).

When it is determined by an ECU 10 that the platoon information held therein and the platoon information received from the other platoon vehicle(s) do not match, the ECU 10 updates the platoon information held therein by overwriting the information in the self-vehicle by the platoon information received from the other platoon vehicle(s).

In the above-described manner, the same platoon information is shared with all platoon vehicles. Such an update and transmission of the platoon information may be performed at any timing after the completion of the platoon departure process.

As explained in the above, by grouping the vehicles having the first range projection areas in the top group of the platoon and by grouping the vehicles having the second range projection areas in the tail end group of the platoon, the platoon travel system of the present embodiment enables that the second range projection area vehicles are positioned to follow the first range projection area vehicles. Thus, the vehicles in the follow group have lower travel resistance than they travel alone without having the lead group. As a result, the energy consumption of the whole platoon is reduced.

Further, the platoon travel system prevents the deterioration of whole platoon energy consumption by positioning the vehicles in an ascending order of depart point distances in the lead group and by positioning the vehicles in a descending order of depart point distances in the follow group (i.e., in the lead group, a vehicle order from a top of the platoon is a near depart point vehicle to a far depart point vehicle, and, in the follow group, a vehicle order from a tail end toward the top of the platoon is a near depart point vehicle to a far depart point vehicle).

In other words, the platoon organization/re-organization in the above-described manner always makes the departing vehicle depart either from a top of the platoon or a tail end of the platoon. In such manner, the platoon will be less frequently collapsed. To put it differently, a vacant position in the platoon caused by the departure of a vehicle from the platoon will be less frequently generated.

For such reason, the platoon travel system of the present disclosure prevents deterioration of whole platoon energy consumption caused by the vacant position in the platoon. In other words, the deterioration of whole platoon energy consumption in a period after a collapse of the platoon and before re-organization of the platoon (i.e., during the platoon reform period) is prevented by the platoon travel system of the present disclosure.

Figure 13:
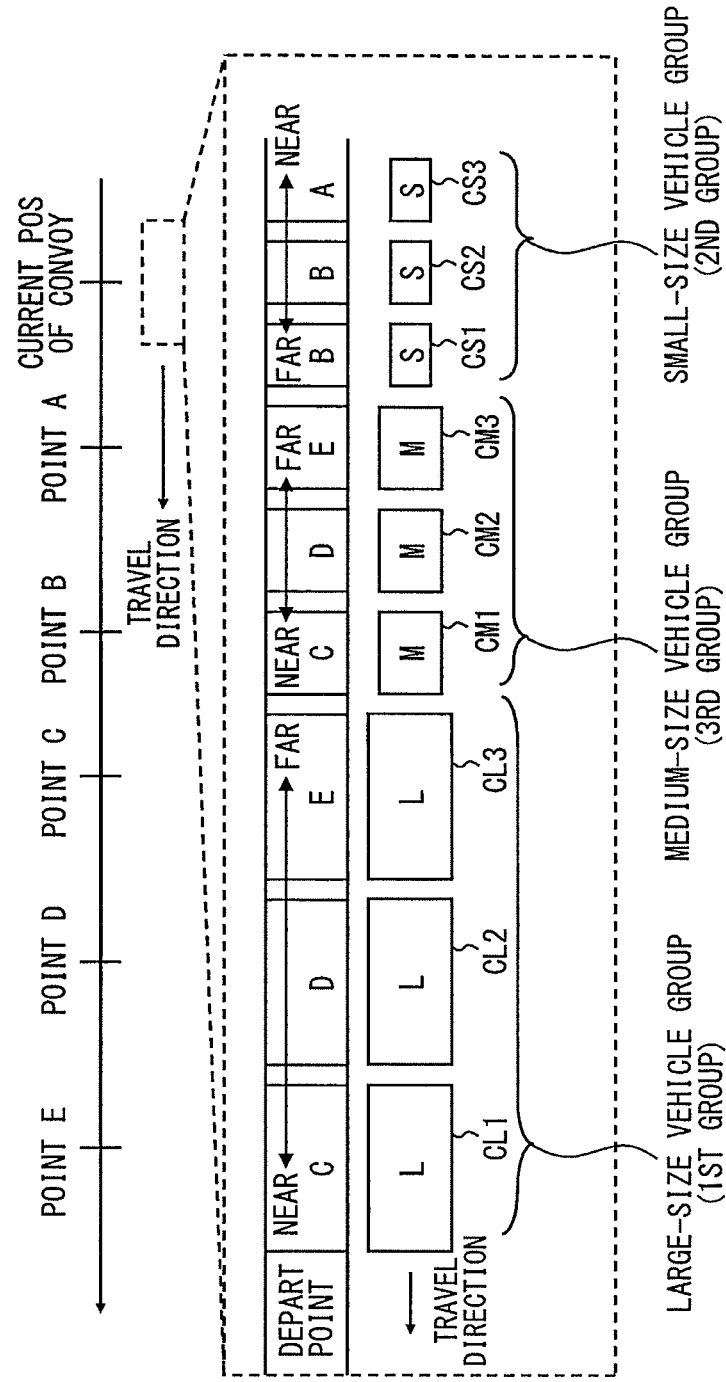
FIG. 13 is an illustration of an example of the platoon in an embodiment of the present disclosure.

Even when a platoon is the one organized according to the organization rule by the platoon travel system, if a vehicle or two depart from the platoon, the platoon becomes the one that does not agree with the organization rule. That is, as shown in FIG. 13, a platoon having a third vehicle group in addition to the first vehicle group and the second vehicle group is used as an example, in which the third vehicle group is a vehicle group of medium-size vehicles. The processing at a time of organizing a platoon which has the third vehicle group will be explained later. Further, the platoon shown in FIG. 13 may also be referred to as a pre-departure platoon.

In this example, the first vehicle group includes the large-size vehicle CL1 whose depart point is the point C, the large-size vehicle CL2 whose depart point is the point D, and the large-size vehicle CL3 whose depart point is the point E. Further, the third vehicle group includes a medium-size vehicle CM1 whose depart point is the point C, a medium-size vehicle CM2 whose depart point is the point D, and a medium-size vehicle CM3 whose depart point is the point E. Further, the second vehicle group includes the small-size vehicle CS1 whose depart point is the point B, the small-size vehicle CS2 whose depart point is the point B, and the small-size vehicle CS3 whose depart point is the point A.

When this platoon passes the point B, all vehicles in the second vehicle group depart from the platoon. Then, the platoon after the departure of all vehicles in the second vehicle group from the platoon includes the large-size vehicle group and the medium-size vehicle group. In other words, a post-departure platoon includes the first vehicle group containing the large-size vehicles CL1-CL3 and the second vehicle group containing the medium-size vehicles CM1-CM3. Thus, the second vehicle group of the post-departure platoon is the third vehicle group of the pre-departure platoon.

Figure 14:
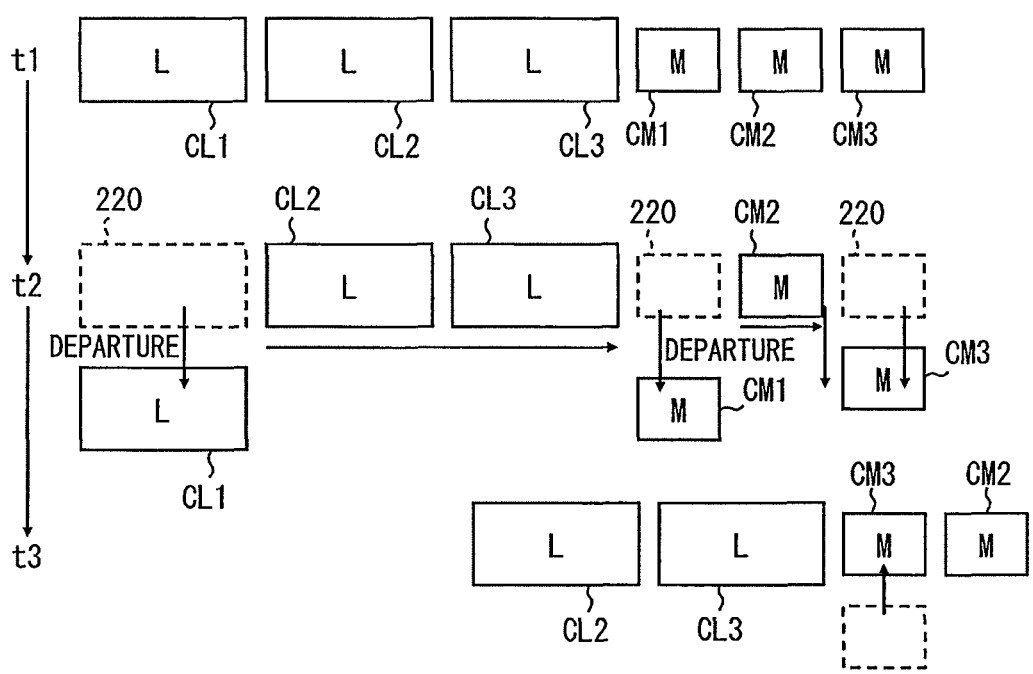
FIG. 14 is an illustration of a during-travel re-organization in an embodiment of the present disclosure.

In the first vehicle group of the post-departure platoon, vehicles are positioned in an order of depart point distances, i.e., nearer depart point vehicles positioned closer to a top of the platoon, which agrees with the organization rule. However, in the second vehicle group of the post-departure platoon, the order of the vehicle positioning does not agree with the normal organization rule that positions nearer depart point vehicles positioned closer to a tail end in the second vehicle group of the platoon, because farther depart point vehicles positioned closer to the tail end in the second vehicle group, i.e., in the post-departure platoon as shown in FIG. 14 at timing t1.

In such a case, the ECU 10 performs a re-organization process for re-organizing the platoon so that the platoon agrees with the organization rule. Here, the re-organization process of the ECU 10 is explained with reference to FIGS. 12A/B, FIG. 14, and FIG. 15. The platoon at timing t1 of FIG. 14 is the above-mentioned post-departure platoon.

Figure 12A:
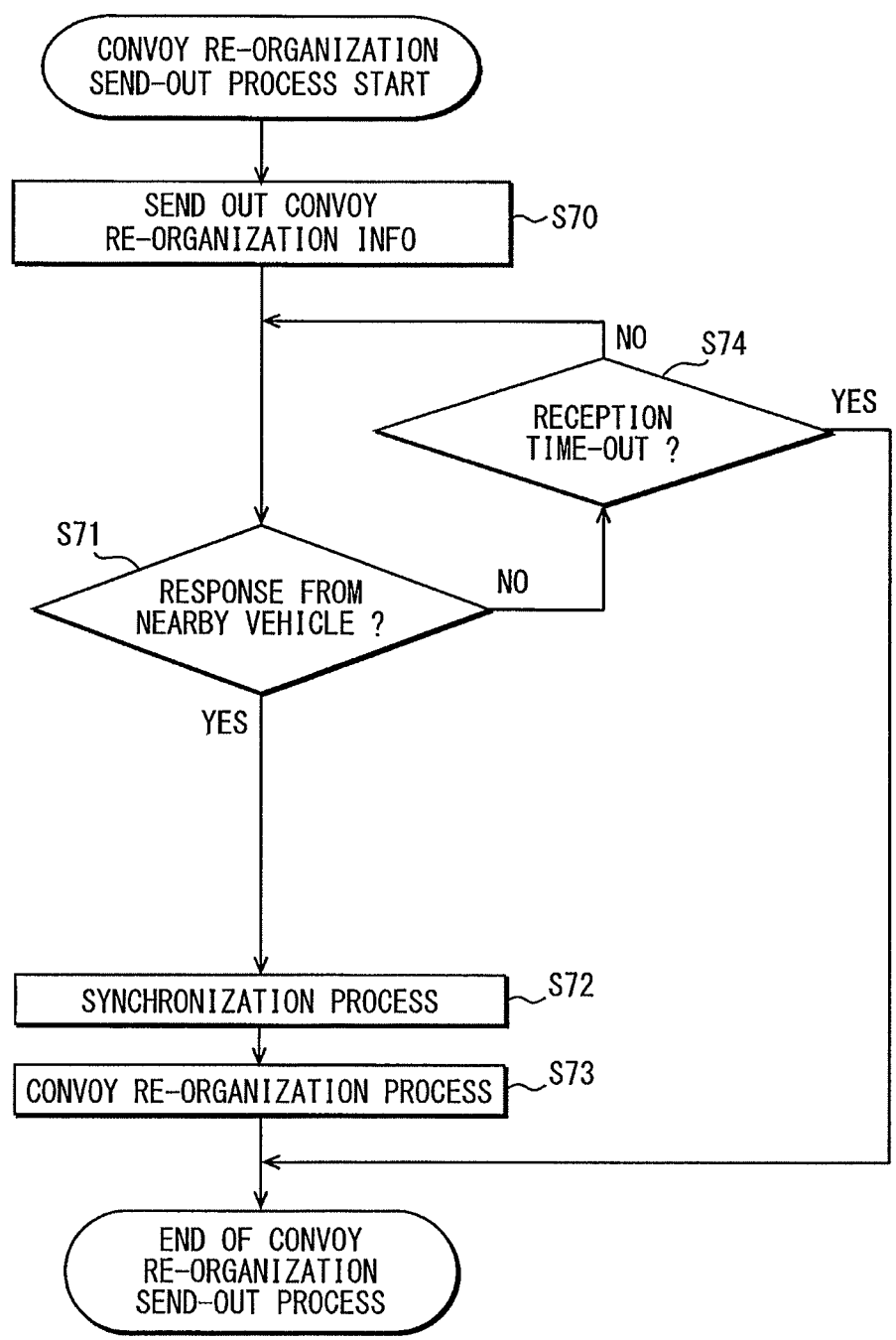
FIGS. 12A/B are flowcharts of the processing operation of the platoon travel system in an embodiment of the present disclosure.
Figure 12B:
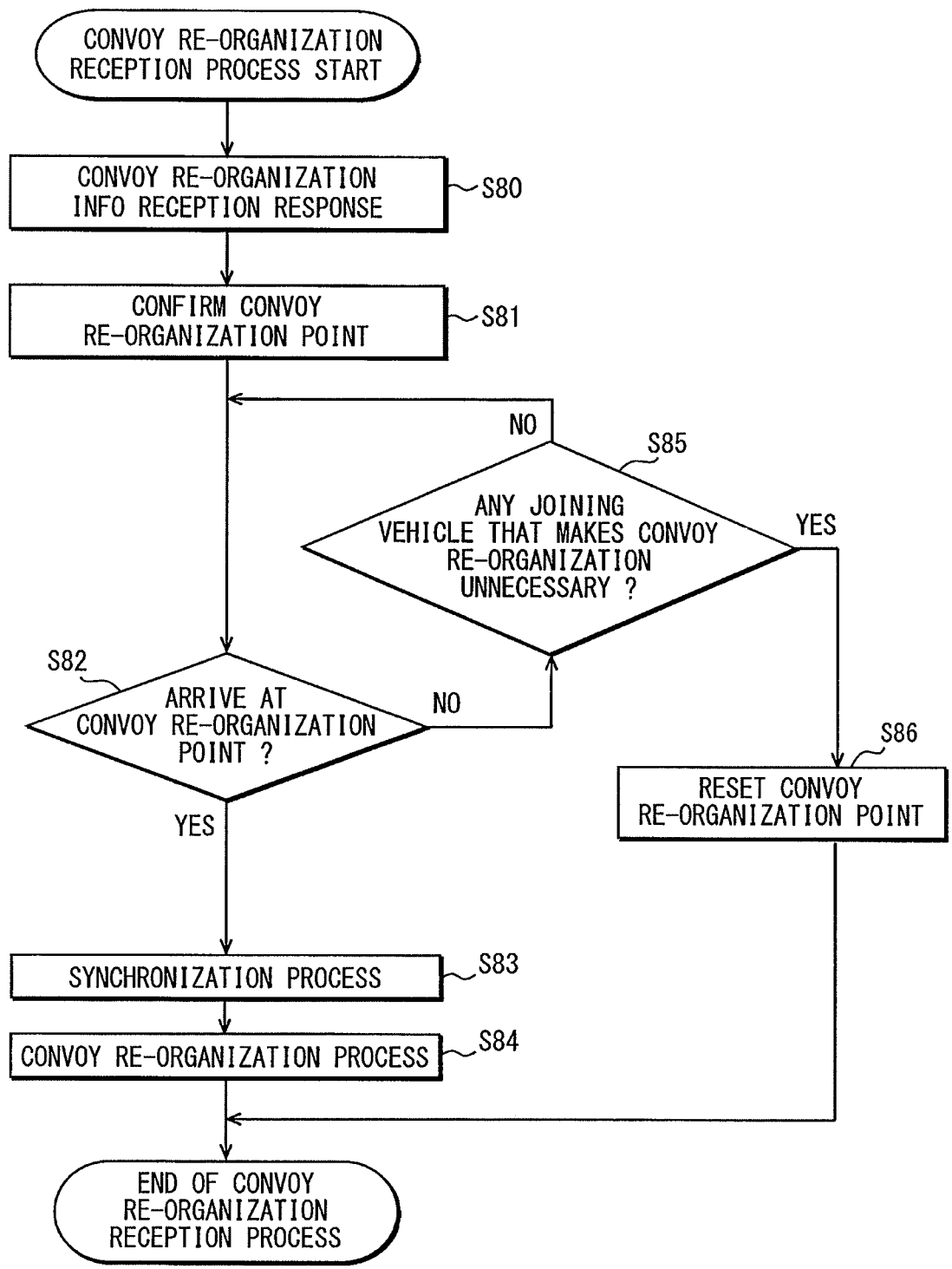

Steps S70-S74 shown in FIG. 12A show the platoon re-organization send-out process which is performed by the manager 13. When receiving an input of the re-organization request information via the antenna 21, the communication device 20, and the communication part 11, the manager 13 acknowledges that it is necessary to re-organize the platoon, and performs the platoon re-organization send-out process. Alternatively, if the re-organization request information is input via the input part 12 from the user interface 60, the manager 13 considers that it is necessary to re-organize the platoon, and performs the platoon re-organization send-out process. Alternatively, if the re-organization request information is input from the departure processor 15, the manager 13 considers that it is necessary to re-organize the platoon, and performs the platoon re-organization send-out process. On the other hand, Steps S81-S88 in FIG. 12B show the platoon re-organization reception process which is performed by the manager 13. When the platoon re-organization information is input via the antenna 21, the communication device 20, and the communication part 11, the manager 13 considers/acknowledges that it is necessary to re-organize the platoon, and performs the platoon re-organization reception process. This platoon re-organization send-out process and the platoon re-organization reception process are processes which are performed by the manager 13 of the ECU 10 disposed in the vehicles participating in the post-departure platoon.

In Step S70, the platoon re-organization information is sent out. That is, the manager 13 transmits the platoon re-organization information via the communication part 11, the communication device 20, and the antenna 21.

Corresponding to such transmission, the manager 13 of the ECU 10 which has received the platoon re-organization information performs processing of Step S80. That is, in Step S80, the manager 13 responds to the platoon re-organization information which has just received. At such time, the manager 13 sends out, to the other vehicle which has participated in the post-departure platoon, response information which shows that the platoon re-organization information has been received via the communication part 11, the communication device 20, and the antenna 21. Thus, the variety of information in the pre-re-organization process (i.e., G1 G2-info) output from the manager 13 to the communication part 11 in FIG. 3 includes such response information.

On the other hand, in Step S71, it is determined whether the other platoon vehicles in the post-departure platoon have responded. That is, the manager 13 determines whether the response information sent out in the above-mentioned step S80 has been received. When the response information has been received via the communication part 11, the communication device 20, and the antenna 21, the manager 13 determines that there is a response, and the process proceeds to Step S72. On the other hand, when the response information has not been received, the manager 13 determines that there is no response, and the process proceeds to Step S74. Thus, the variety of information in the pre-re-organization process output from the communication part 11 to the manager 13 in FIG. 3 includes such response information.

In Step S74, it is determined whether it is a reception time-out. That is, the manager 13 determines whether it is a reception time-out based on whether a preset time has passed after transmission of the platoon re-organization information in Step S70. In other words, the manager 13 determines whether it is a reception time-out based on whether a response from one of the nearby vehicles has arrived in a preset time, after transmitting the platoon re-organization information in Step S70.

When it is determined that the preset time has not passed yet after transmitting the platoon re-organization information, it is determined that it is not yet a reception time-out, and the process returns to Step S71, or when it is determined that the preset time has already passed after transmitting the platoon re-organization information, it is determined that it is a reception time-out now to conclude the platoon re-organization send-out process.

On the other hand, the manager 13 which has responded to the received platoon re-organization information confirms about a platoon re-organization point in Step S81 to the other platoon vehicle (i.e., all vehicles except the self-vehicle) in the post-departure platoon. At such time, the manager 13 confirms whether the platoon is re-organized at a point at which a vehicle departs from the platoon or at a next rest point.

Since the ECU 10 shares the depart point information of platoon vehicles with the other ECUs 10, the ECU 10 knows a next point at which a vehicle departs from the platoon. Further, the ECU 10 recognizes where the next rest point would be when a service area, a rest area or the like is set up as a relay point by the navigation device 30. Thus, the ECU 10 recognizes nearer one of the above two points (i.e., one of the next depart point or the relay point) as a platoon re-organization point.

In Step S82, the manager 13 examines whether it has arrived at the platoon re-organization point. At such time, by comparing the platoon re-organization point confirmed in Step S81 with the current position acquired from the navigation device 30 via the input part 12, the manager 13 confirms whether the platoon has arrived at the platoon re-organization point. When it is determined that the platoon has arrived at the platoon re-organization point, the process proceeds to Step S83, and, when it is determined that the platoon has not arrived at the platoon re-organization point, the process proceeds to Step S85. Further, an arrival of the platoon at the platoon re-organization point may be confirmed mutually by two or more ECU 10s disposed in the platoon vehicles.

In Step S85, it is determined whether there is any joining vehicle that makes the platoon re-organization unnecessary. That is, the manager 13 determines whether there is any joining vehicle(s) that would like to join in the platoon and whether such joining of new vehicle(s) would make the re-organization of the platoon unnecessary. When it is determined that there is/are joining vehicle(s) which makes the platoon reorganization unnecessary, the process proceeds to Step S86, and, when it is determined that there is no joining vehicle which makes the platoon reorganization unnecessary, the process returns to Step S82.

Under a certain circumstance, join-in of a new vehicle or vehicles makes the platoon re-organization unnecessary. Therefore, when there is a joining vehicle, processing of Step S10 and subsequent processes as well as processing of Step S20 and subsequent processes shown in the above-mentioned FIGS. 5A/B are performed. The manager 13 can then determine whether there is any platoon joining vehicle that makes the platoon re-organization unnecessary by acquiring the platoon information from the communication part 11 and confirming the acquired platoon information. Thus, in FIG. 3, the variety of information of the during-re-organization process that is output from the communication part 11 to the manager 13 (i.e., G-2 info) includes the platoon information.

In Step S86, the platoon re-organization point is reset, and it is notified to all vehicles that are performing the platoon travel. At such time, the manager 13 sends out a reset signal which shows a reset of the platoon re-organization point via the communication part 11, the communication device 20, and the antenna 21 to the other vehicles which are in the post-departure platoon.

In Steps S72 and Step S83, a synchronization process is performed in the vehicles participating in the post-departure platoon. The synchronization process is a processing which synchronizes all platoon vehicles participating in the post-departure platoon, in order to re-organize the platoon. The manager 13 of each of the platoon vehicles participating in the post-departure platoon synchronizes with each other of platoon the re-organization process via the antenna 21, the communication device 20, and the communication part 11 which are disposed in each of those vehicles, for performing the platoon re-organization process.

In Steps S73 and Step S84, each of the vehicles in the post-departure platoon performs the platoon re-organization process (i.e., a third drive unit in the claims). Here, the platoon re-organization process is explained with reference to an example of FIG. 14 and FIG. 15.

Figure 15:
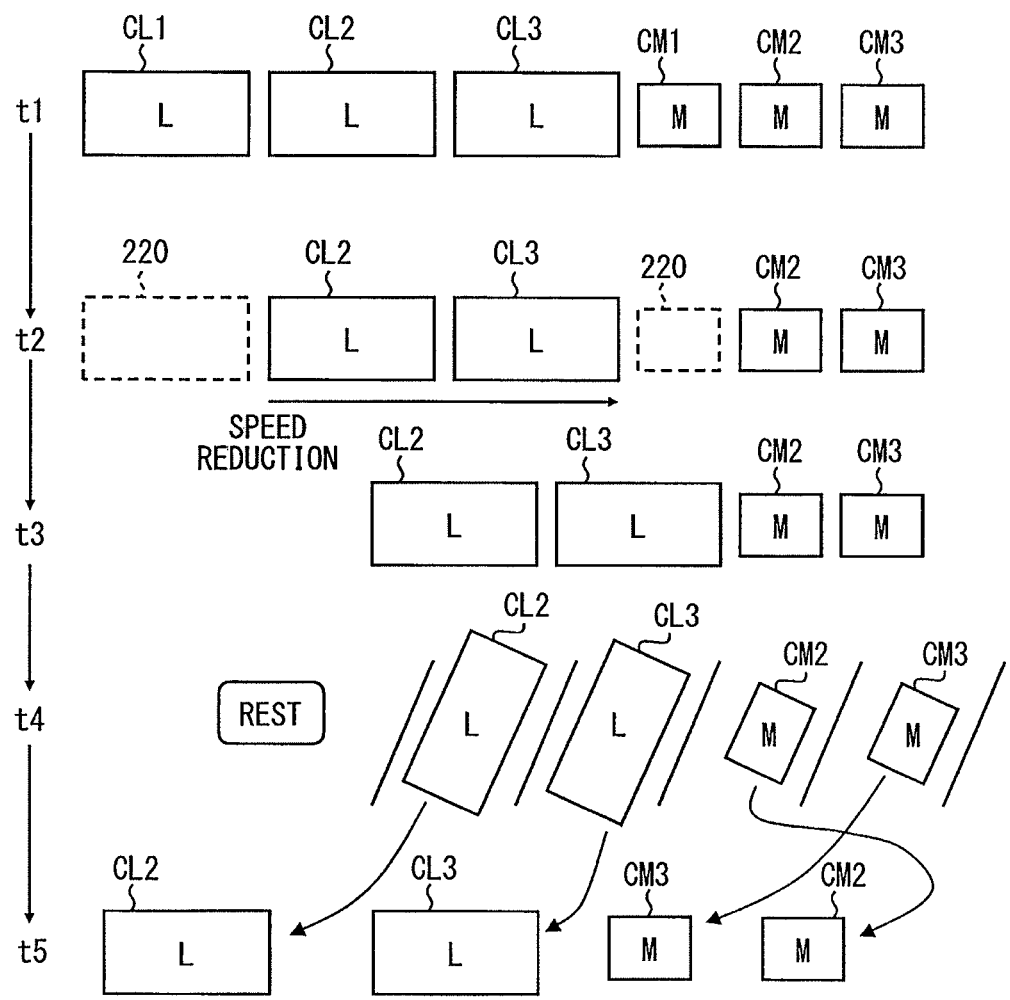
FIG. 15 is an illustration of a rest-stop time re-organization in an embodiment of the present disclosure.

FIG. 14 is an illustration of how the platoon re-organization process is performed during the travel of the platoon at the next point (i.e., the point C) where a departing vehicle departs from the platoon, and FIG. 15 is an illustration of how the platoon re-organization process is performed at the next rest point.

First, the example of FIG. 14 is explained first. The platoon at timing t1 of FIG. 14 shows a post-departure platoon in which all vehicles in the second vehicle group have departed from the platoon when the platoon in FIG. 13 has arrived at the point B. When the platoon in FIG. 14 arrives at the point C, the large-size vehicle CL1 and medium-size vehicle CM1 will further depart from it.

The post-departure platoon, from which the large-size vehicle CL1 and medium-size vehicle CM1 will have already departed from the platoon in FIG. 14, will have a following order of vehicles when the platoon re-organization process will not be performed. That is, in the post-departure platoon, the large-size vehicle CL2 is positioned at a top, and then the large-size vehicle CL3, the medium-size vehicle CM2, and the medium-size vehicle CM3 respectively follow in this order. Thus, in the post departure vehicle positioning, the first vehicle group includes the large-size vehicle CL2 and the large-size vehicle CL3, and, the second vehicle group includes the medium-size vehicle CM2 and the medium-size vehicle CM3, thereby causing no problem in terms of larger so projection area vehicles traveling in a front part of the platoon. However, in the second vehicle group, the medium-size vehicle CM3 whose depart point is the point E is positioned behind the medium-size vehicle CM2 whose depart point is the point D. In other words, when the platoon arrives at the point D, the medium-size vehicle CM2 positioned in front of the medium-size vehicle CM3 that is a tail end vehicle of the platoon departs from the platoon earlier than the vehicle CM3, which leads to a collapse of the platoon. That is, this post-departure vehicle does not agree with the organization rule in the present disclosure.

Therefore, when the platoon arrives at the point C as shown at timing t2 of FIG. 14, the platoon re-organization process will be performed (i.e., a third drive unit in the claims). Further, after the departure of the large-size vehicle CL1 and the medium-size vehicle CM1 from the platoon at the point C, a position at a top of the platoon (i.e., a position which was occupied by the large-size vehicle CL1) and a position between the large-size vehicle CL3 and medium-size vehicle CM2 are left as two vacant positions, i.e., respectively as a the post-departure space 220. In such a case, in order to change the travel order of the medium-size vehicle CM2 and the medium-size vehicle CM3, the medium-size vehicle CM3 changes lanes once (i.e., a drive control). Then, the medium-size vehicle CM3 re-joins into the post-departure space 220 (i.e., a drive control).

As described in the above, by re-organizing the platoon while the platoon is travelling, the number of platoon collapses is reduced, and the energy consumption of the platoon is reduced.

Further, at a position between the large-size vehicle CL3 and the medium-size vehicle CM2, a join-in space 210 for accommodating a medium-size vehicle may be provided on demand. For the re-joining of the once-lane-changed vehicle, it may be preferable to provide the join-in space 210 by decelerating vehicles behind a re-joining space. In such manner, the re-joining space may be provided in a travel resistance reduced manner, thereby preventing the deterioration of whole platoon energy consumption.

Further, when the platoon re-organization process is performed, an inter-vehicle distance may be widened to a more-than-required distance. In such a case, it may be desirable to decrease the more-than-required distance by reducing the vehicle speed. In the example of FIG. 14, the inter-vehicle distance between the first vehicle group and the second vehicle group may be widened to a more-than-required distance, due to a lack of the vehicle position switching in the first vehicle group and the vehicle position switching in the second vehicle group in the course of platoon re-organization. Therefore, the large-size vehicle CL2 and the large-size vehicle CL3 in the first vehicle group may preferably reduce the inter-vehicle distance to the second vehicle group by reducing the vehicle speed. In the above-described manner, the travel resistance of the vehicles can be reduced in comparison to the inter-vehicle distance reduction by accelerating the vehicles, thereby preventing deterioration of the whole platoon energy consumption.

Next, an example in FIG. 15 is explained. The platoon shown at timing t1 of FIG. 15 is a post-departure platoon from which all vehicles in the second vehicle group have already departed at the point B when the platoon in FIG. 13 has arrived there. Therefore, when this post-departure platoon arrives at the point C as shown at timing t2 of FIG. 15, the large-size vehicle CL11 and the medium-size vehicle CM1 further depart therefrom, and the platoon does not 16 agree with the organization rule of the present disclosure any more as shown at timing t3 of FIG. 15. In this case, all vehicles of the platoon after such departure park in a parking space, in a manner as shown at timing t4 for the rest of the travel. Whether the platoon has parked or not in a parking space may be determined based on the current position and map data of the navigation device 30. As an example of the parking space, a parking area, a service area and the like in a rest area may be considered.

Then, as shown at timing t5, when finishing rest and making a restart, the re-organization process is performed so that the platoon agrees with the organization rule of the present disclosure (i.e., a third drive unit in the claims). In other words, starting orders of the vehicles are made to realize a vehicle order so that the positioning of the vehicles in the platoon agrees with the organization rule. In the example of FIG. 15, the starting order of the vehicles are, the large-size vehicle CL2 first, with the large-size vehicle CL3, the medium-size vehicle CM3, and the medium-size vehicle CM2 following therefrom.

Thus, even when the platoon became inconsistent with the organization rule due to the departure of vehicle(s), the platoon is re-organized to be consistent with the organization rule by performing the platoon re-organization send-out process and the platoon re-organization reception process shown in FIG. 12. Further, by performing the platoon re-organization at a time of resuming the travel after the parking in a parking area as described above, the re-organization of the platoon is performed at a place where no travel resistance exists, thereby enabling the reduction of the energy consumption.

As explained in the above, when organizing a platoon by the plural vehicles and traveling in such manner, the energy consumption of the whole platoon can be reduced. This is because the air resistance of the self-vehicle is reduced by the vehicles traveling in front in other words, the second vehicle positioned behind the top vehicle of the platoon and the vehicles subsequent thereto vehicle can reduce the energy consumption. However, a vehicle traveling at a very top of the platoon cannot reduce the energy consumption, since there is no vehicle traveling in front of the top vehicle of the platoon.

Therefore, it may be preferable to give an incentive to a vehicle that travels at a very top of the platoon (i.e., an incentive unit in the claims). That is, vehicles may be incentivized to travel at a top position of the platoon. By setting a certain incentive, a vehicle which would like to travel at the top of the platoon may be increased. As a result, the vehicles which participate/join in the platoon will increase in number, and the energy consumption in the whole platoon can be further reduced.

In order to give an incentive, the ECU 10 saves a top travel record which shows a travel history of a self-vehicle as a top of the platoon based on the platoon information and the information acquired from the navigation device 30 (i.e., a save unit in the claims). For example, the top travel record could be a record indicating the amount of travel of the self-vehicle at the top of the platoon. Since the ECU 10 disposed in each of the platoon vehicles has the platoon information, an in-platoon position of the self-vehicle and in-platoon positions of the other vehicles are recognizable. Further, the ECU 10 disposed in each of the platoon vehicles can calculate a travel distance of the self-vehicle at a top position in the platoon, based on the travel route of the platoon that is acquired from the navigation device 30. Therefore, the ECU 10 can generate the top travel record by accumulating the travel distances of the self-vehicle at the top of the platoon.

Then, the ECU 10 transmits, to a control center that is disposed outside of the vehicle, the top travel record together with identification information, such as an ID or the like, via the communication device 20 and the antenna 21. In the control center, an incentive is given to the vehicle according to the travel history in the top travel record transmitted from each of the vehicles. For example, in the control center, it is determined whether an incentive is given according to the travel history. Then, in the control center, a vehicle (i.e., an ID of a vehicle) and an incentive given to the vehicle are associated and saved. In the above-described manner, the control center can collect and manage the travel history and the vehicle information of all the vehicles that use the platoon travel system.

Further, the control center may be implemented as a control center of an ETC system (i.e., an electric toll collection system in Japan). In this case, as an incentive, a preset amount of discount (e.g., monetary discount) for an expressway toll may be employable. In other words, the control center (i.e., an incentive unit in the claims) may provide a preset amount of discount for an expressway toll as an incentive. The preset amount of discount for the expressway toll is instantaneously provided to expressway users, thereby enabling the small entitles such as an individual, a small company and the like to recognize the merit quickly.

Further, the control center may be provided as a control center of a country or of a local government in this case, as an incentive, a tax cut regarding a vehicle may be provided. In other words, the control center (i.e., an incentive unit in the claims) may provide, as an incentive, a preset amount of tax cut regarding a vehicle. Such a tax cut regarding a vehicle may be collectively provided by a large amount for a business owner or the like, thereby enabling the business owner, especially for the owner of a large business, to recognize the merit.

Further, the ECU 10 disposed in each of the platoon vehicles may mutually examine the contents of the top travel record to see whether the records are correct (i.e., confirmed or approved), for providing an approval (i.e., an approval unit in the claims). Such an approval can be performed based on the platoon information, for example. In this case, an incentive is given based on the information which shows such an approval (i.e., an approval result).

By devising such an approval scheme, it may be unnecessary for the control center to manage the travel history. Therefore, the control center needs to perform a control of actually provided incentives only, which leads to the cost reduction on a control center side.

Further, when giving an incentive, the incentive may be weighted according to vehicle types. For example, incentive weight for the vehicles in a large-size vehicle group may be higher, relative to incentive weight for the vehicles in a small-size vehicle group or a medium-size vehicle group. Further, incentive weight for the vehicles in a middle-size vehicle group may be higher, relative to incentive weight for the vehicles in a small-size vehicle group.

Although the present disclosure has been fully described in connection with preferred embodiment thereof with reference to the accompanying drawings, it is to be noted that various changes and modifications will become apparent to those skilled in the art.

Modification Example 1

The above-mentioned embodiment uses two types of vehicles as an example of vehicle group classification for the explanation of the platoon. However, the present disclosure is not limited to such configuration. That is, as shown in FIG. 16, three types of vehicles may also be used for organizing a platoon.

The configuration of the platoon travel system in the modification example 1 is the same as the one in the above-mentioned embodiment. Further, most of the processing operations of the platoon travel system in the modification example 1 are the same as the processing operation in the above-mentioned embodiment. Here, description is focused to the difference of the processing operation of the platoon travel system in the modification example 1 from the one in the above-mentioned embodiment.

Figure 16:
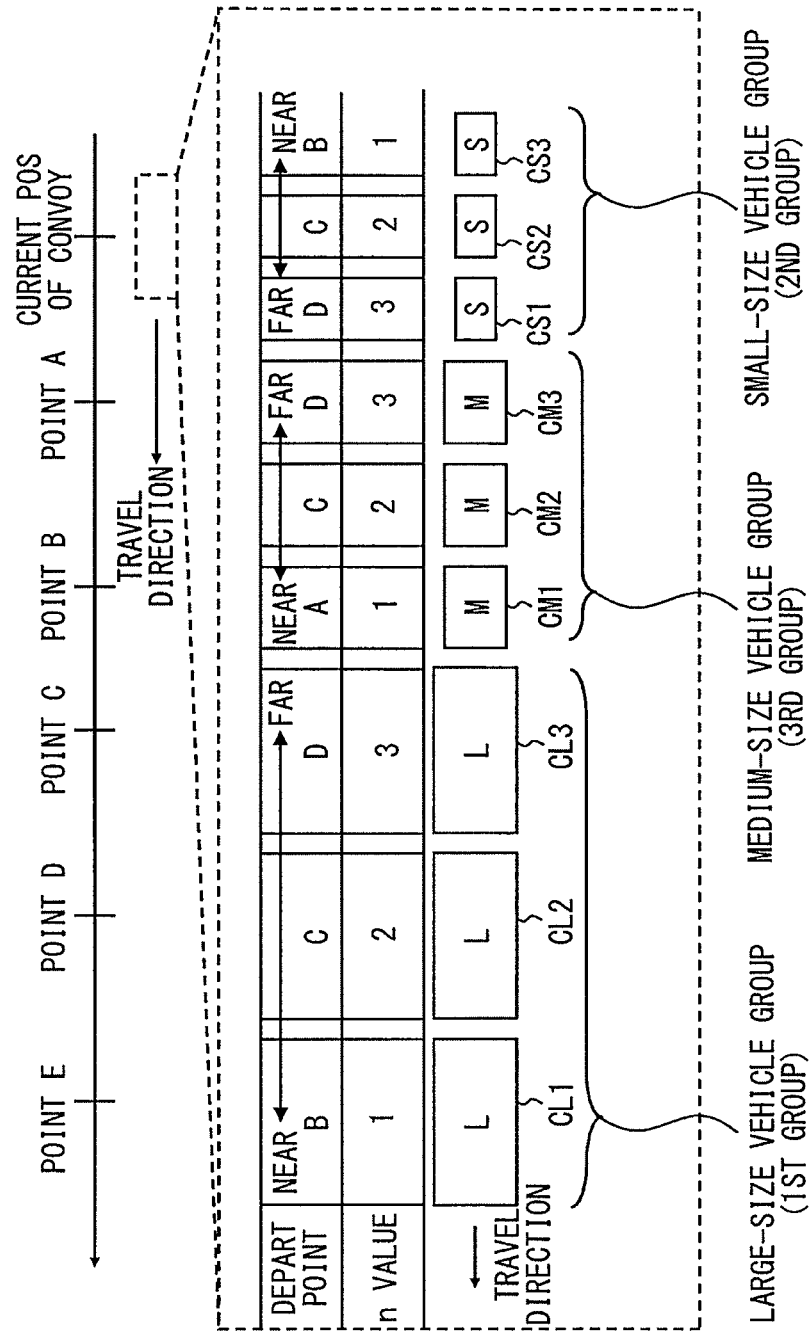
FIG. 16 is an illustration of an example of the platoon in a first modification.

In FIG. 16, the platoon includes, in addition to the first vehicle group and the second vehicle group, the third vehicle group that is a group of medium-size vehicles. In this case, the first vehicle group in FIG. 16 is the same as the first vehicle group of FIG. 8, and the second vehicle group in FIG. 16 is the same as the second vehicle group of FIG. 8.

The third vehicle group includes medium-size vehicles, the body size of which is smaller than the first range, and larger than the second range. In other words, the platoon travel system groups, as the third vehicle group, the vehicles having the body size smaller than the first range and larger than the second range. Here, as shown in FIG. 16, the third vehicle group is configured to include the medium-size vehicle CM1 to the medium-size vehicle CM3. The medium-size vehicle CM1 departs from the platoon at the point A. The medium-size vehicle CM2 departs from the platoon at the point C. The medium-size vehicle CM3 departs from the platoon at the point D.

Based on the projection area of the vehicles, the platoon travel system positions a vehicle group with large projection area vehicles as a top group of the platoon, and positions a vehicle group with small projection area vehicles as a tail end group of the platoon. Therefore, in case that there are three vehicle types respectively forming a vehicle group, an order of the vehicle groups are, from a top of the platoon toward a tail end, the first vehicle group that is a group of the large-size vehicles, the third vehicle group that is a group of the medium-size vehicles, and the second vehicle group that is a group of the small-size vehicles. In other words, the third vehicle group is positioned between the first vehicle group and the second vehicle group. Therefore, the third vehicle group may be designated as a middle vehicle group positioned in a middle of the top vehicle group and the tail end vehicle group.

Further, the platoon travel system determines the vehicle positions in the vehicle group that is a top group of the platoon, in a "near depart point vehicles come closer to platoon front" manner, just like the above-mentioned embodiment. Therefore, in the example of FIG. 16, in the first vehicle group, the large-size vehicle CL1 comes to a platoon top side, the large-size vehicle CL2 follows, and the large-size vehicle CL3 comes last in the vehicle order.

Further, the platoon travel system determines the vehicle positions in the second vehicle group that is a tail end group of the platoon, in a "near depart point vehicles come closer to platoon tail end" manner, just like the above-mentioned embodiment. Therefore, in the example of FIG. 16, in the second vehicle group, the small-size vehicle CS1 comes to a platoon top side, the small-size vehicle CS2 follows, and the small-size vehicle CS3 comes to the last in the vehicle order.

Further, the platoon travel system determines the vehicle positions in the third vehicle group that is a middle group of the platoon, in a "near depart point vehicles come closer to platoon front" manner. In the example of FIG. 16, in the third vehicle group, the medium-size vehicle CM1 comes to a platoon top side, the medium-size vehicle CM2 follows, and the medium-size vehicle CM3 comes last in the vehicle order.

Figure 17:
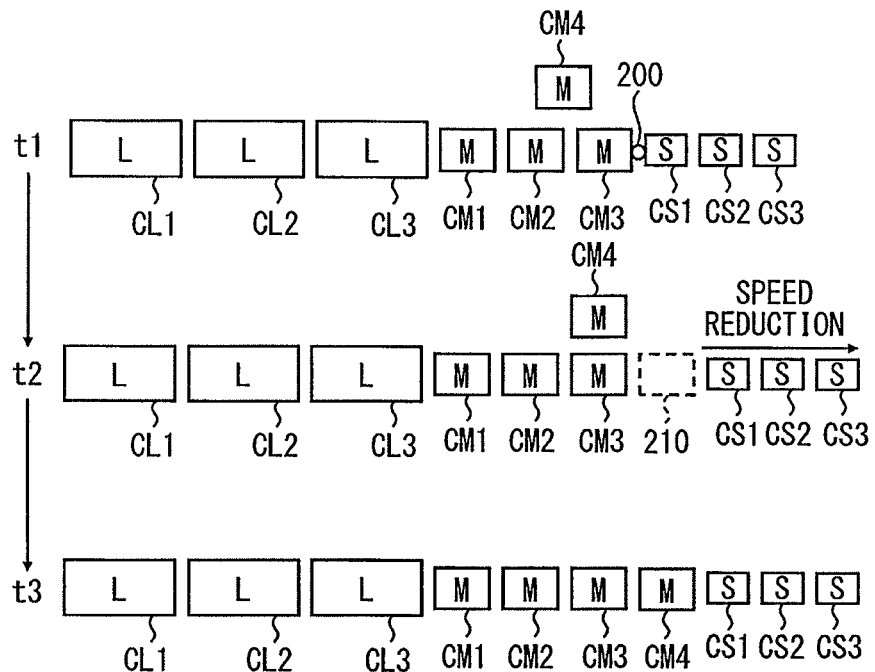
FIG. 17 is an illustration of vehicle behaviors at a join-in time in the first modification.

Here, with reference to FIG. 17, the processing operation of the platoon travel system is described in which a joining vehicle joins in the third vehicle group of a platoon that has three types of vehicles as three vehicle groups. When a vehicle joins in a platoon, the join-in processor 14 of the ECU 10 that is disposed in a joining vehicle CM4 performs the join-in send-out process as mentioned above. On the other hand, the join-in processor 14 of the ECU 10 that is disposed in at least one of the platoon vehicles performs the join-in reception process as mentioned above.

The platoon shown at timing t1 of FIG. 17 is the same as that of the platoon shown in FIG. 16. Further, in the example of FIG. 17, it is assumed as a situation in which the medium-size vehicle CM4 has shown a join-in intention and the join-in of the medium-size vehicle CM4 to the platoon has already been permitted. In other words, in this example, the medium-size vehicle CM4 is equivalent to a joining vehicle. Therefore, the vehicle CM4 may be designated as the joining vehicle CM4 hereafter. In this case, a depart point of the joining vehicle CM4 is the point E.

The join-in processor 14 in a platoon vehicle computes the join-in group of the joining vehicle CM4 based on the projection area of the joining vehicle CM4 and the projection areas of the large-size vehicles CL1-CL3, the medium-size vehicles CM1-CM3, and the small-size vehicles CS1-CS3, each of which are a vehicle participating in the current platoon. Further, the joining vehicle CM4 is a medium-size vehicle. Therefore, the projection area of the joining vehicle CM4 is within the third range. Thus, the join-in processor 14 computes the third vehicle group as the join-n group of the joining vehicle CM4. In other words, the join-in processor 14 determines the third vehicle group as the join-in group of the joining vehicle CM4.

Next, the join-in processor 14 in a platoon vehicle performs the join position determination process. As described above, when the join-in group of the joining vehicle CM4 is determined as the third vehicle group, the join-in processor 14 in the platoon vehicle performs a comparison between (i) a depart point of the joining vehicle and (ii) a depart point of each of the all vehicles in the join-in group, and determines the join position of the joining vehicle CM4 so that near depart point vehicles come closer to platoon front. In the example of FIG. 17, the depart point of the joining vehicle CM4 is further than the depart points of the medium-size vehicles CM1-CM3. Therefore, the join-in processor 14 in a platoon vehicle determines a position between the medium-size vehicle CM3 and the small-size vehicle CS1 as a join position 200.

In the example of this FIG. 17, the join position 200 is not the top or the tail end of the platoon. Therefore, after determining the join position 200 in this way, just like the above-mentioned embodiment, the small-size vehicles CS1-CS3 which are the platoon vehicles behind the join position 200 slows down, and reserves the join-in space 210 (i.e., at timing t2). In such manner, as shown at timing t3 of FIG. 17, the vehicle groups are positioned, from a platoon top side, in an order of the first vehicle group, the third vehicle group and the second vehicle group, and, in the third vehicle group, the vehicles are positioned, from a platoon top side, in an order of the medium-size vehicle CM1, the medium-size vehicle CM2, the medium-size vehicle CM3, and the medium-size vehicle CM4.

Figure 18:
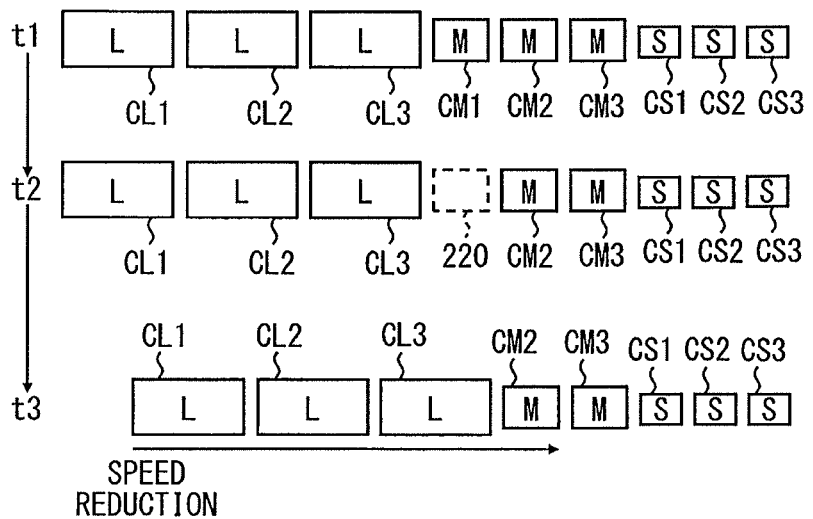
FIG. 18 is an illustration of vehicle behaviors at a departing time in the first modification.

Next, with reference to FIG. 18, the processing operation of the platoon travel system is described in which a vehicle departs from the third vehicle group of a platoon that has three types of vehicles as three vehicle groups. The departure processor 15 of the ECU 10 that is disposed in a vehicle which departs from the platoon performs the departure send-out process as mentioned above. On the other hand, the departure processor 15 of the ECU 10 that is disposed in each of the platoon vehicles other than a departing vehicle performs the departure reception process as mentioned above.

The platoon shown at timing t1 of FIG. 18 is the same as the platoon shown in FIG. 16. When the platoon shown at timing t1 of FIG. 18 arrives at the point A, the medium-size vehicle CM1 will depart from it. In this case, unlike the above-mentioned embodiment, when the medium-size vehicle CM1 departs from the platoon, the post-departure space 220 is formed in the middle of the platoon (i.e., at timing t2).

Then, just like the above-mentioned Steps S56 and S65, by the platoon departure process performed in each of the departing vehicle and non-departing vehicles, the post-departure space 220 is made small (i.e., a second drive unit in the claims). In other words, an inter-vehicle distance between the vehicles positioned before and behind the post-departure space 220 is reduced. At such time, the departure processor 15 of the ECU 10 disposed in the platoon vehicles ahead of the post-departure space 220 outputs the drive information which shows slowing down at a constant rate (i.e., a speed reduction control) to the travel system component 80 via the output part 16, as shown at timing t2 (i.e., a second drive unit in the claims). In the example of FIG. 18, the large-size vehicles CL1-CL3 slow down at a constant rate. The platoon vehicles ahead of the post-departure space 220 return to a pre-slow-down speed by accelerating at a constant rate, after the slow-down and reduction of the post-departure space 220. In the above-described manner, the travel resistance is reduced and deterioration of the energy consumption is prevented in comparison to a control that accelerates the platoon vehicles behind the post-departure space 220.

Further, the post-departure space 220 may be made small by decelerating the platoon vehicles ahead of the post-departure space 220 and accelerating the platoon vehicles behind the post-departure space 220. In the above-described manner, the post-departure space 220 can be more quickly made smaller in comparison to a case in which the platoon vehicles are decelerated for the reduction of the post-departure space 220. That is, a platoon collapse time is reduced in comparison to the same reduction control for reducing the post-departure space 220 by the deceleration of the vehicles. Further, the post-departure space 220 may be made smaller by accelerating the platoon vehicles behind the post-departure space 220.

The platoon travel system in this modification example 1 can yield the same effects as the system described in the above embodiment. Further, a derangement of vehicle train between the medium-size vehicles and the small-size vehicles is prevented is prevented by positioning near depart point vehicles closer to platoon front in the third vehicle group positioned in the middle of the platoon. Therefore, the travel of the small-size vehicles that are less powerful in comparison to the large-size vehicle or the medium-size vehicle is made smoother.

Further, by positioning near depart point medium-size vehicles closer to a front in a travel direction, the disturbance of air resistance caused by a departure of the medium-size vehicle from the platoon, which affects the travel of the small-size vehicles, is made less frequent, thereby preventing deterioration of the energy consumption.

Modification Example 2

In the final position determination process of the above-mentioned embodiment and the modification example 1, the join position is determined based on a depart point of the joining vehicle and a depart point of each of the platoon vehicles. However, the present disclosure is not limited to such configuration. As shown in the modification example 2, in the final position determination process, a join position may be determined based on the remaining energy of the joining vehicle and the remaining energy of the platoon vehicles. Further, the platoon travel system in the modification example 2 is mostly the same as the one in the above-mentioned embodiment. Here, description is focused to the difference of the processing operation of the platoon travel system in the modification example 2 from the one in the above-mentioned embodiment.

The platoon travel system in the modification example 2 differs from the one in the above-mentioned embodiment on the following points. That is, the differences are: (i) an input of information which shows the remaining energy of the self-vehicle to the ECU 10 (i.e., the join-in processor 14), (ii) a transmission and a reception of the information which shows the remaining energy to and from the nearby vehicles, and (iii) the contents of the final position determination process. For example, in the modification example 2, the information (i.e., remaining energy information) which shows the remaining energy is acquired in Step S32 of FIG. 6.

A configuration for outputting the information which shows the remaining energy of the self-vehicle to the ECU 10 may be, for example, that the behavioral information sensor 70 acquires the remaining energy of the self-vehicle, and the sensor 70 then outputs the remaining energy of the self-vehicle. The remaining energy is, for example, a remaining amount of travel energy that is required for a travel of the self-vehicle. Therefore, in a gasoline-powered vehicle or a diesel vehicle, a remaining fuel is equivalent to the remaining energy. In a hybrid vehicle, the remaining fuel and the remaining electric power in a battery are equivalent to the remaining energy. The remaining electric power is equivalent to the remaining energy in an electric vehicle.

Figure 19:
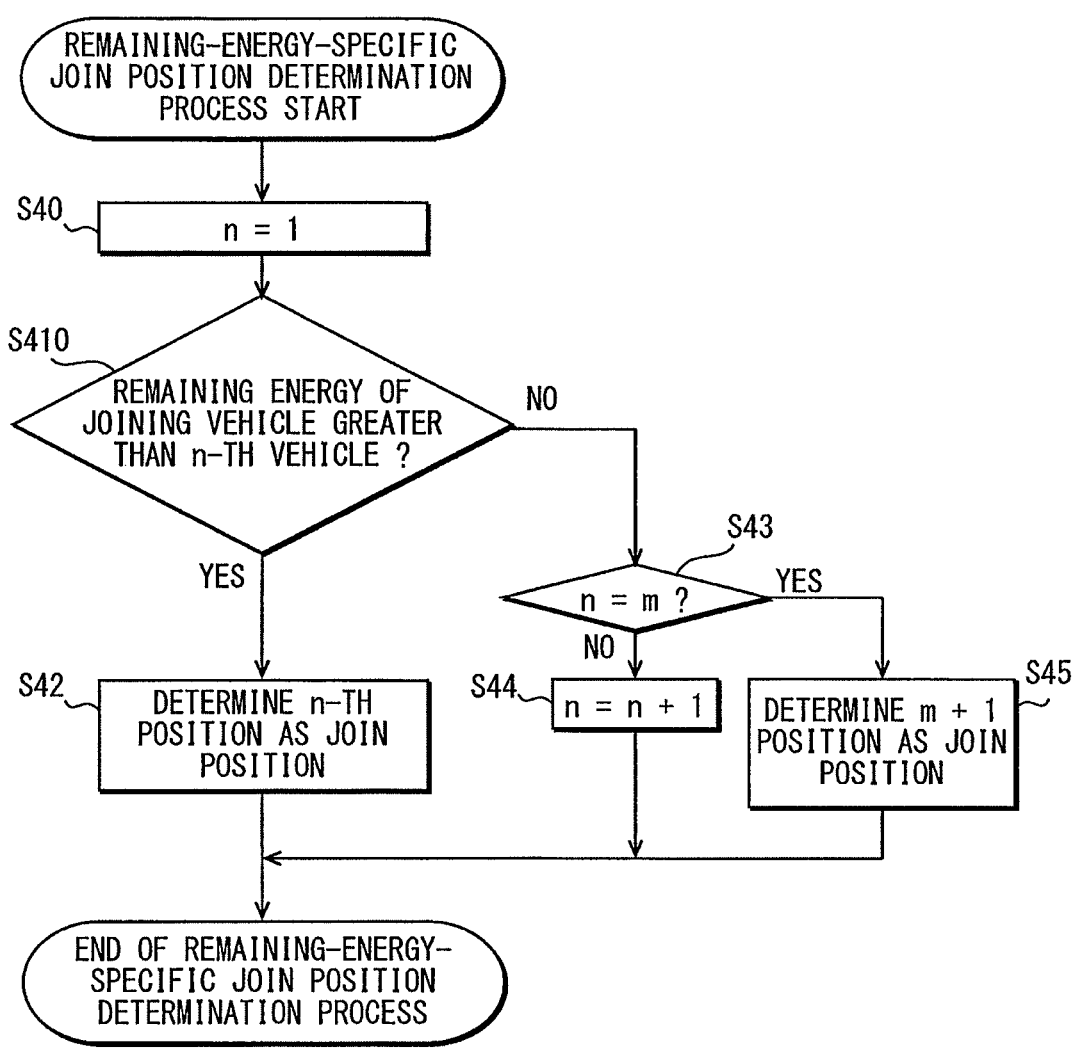
FIG. 19 is a flowchart of a remaining energy specific position determination process by the platoon travel controller in a second modification.

Here, with reference to FIG. 19, the final position determination process in the modification example 2 is explained. As a reminder, the final position determination process in the above-mentioned embodiment determines in Step S40 whether a depart point of the joining vehicle is either the same point as or nearer than a depart point of the n-th vehicle. On the other hand, the final position determination process in the modification example 2 determines in Step S410 whether the remaining fuel of the joining vehicle is larger than the remaining energy of the n-th vehicle. Therefore, in the flowchart of FIG. 19, the same contents of the final position determination process as the one in the above-mentioned embodiment have the same step numbers as FIG. 7, for the brevity of the explanation by avoiding the repetition.

In Step S410, the join-in processor 14 determines whether the remaining energy of the joining vehicle is larger than the remaining energy of the n-th vehicle. When it is determined that the remaining energy of the joining vehicle is larger than the n-th vehicle, the process proceeds to Step S42, and, when it is determined that the remaining energy of the joining vehicle is not larger than the remaining energy of the n-th vehicle, the process proceeds to Step S43.

In such manner, the platoon travel system positions, in the first vehicle group that is a top group of the platoon, a vehicle having larger remaining energy at a position closer to platoon front, that is, the larger remaining energy vehicles come forward in the travel direction (i.e., come closer to a top) in the platoon. Further, the platoon travel system positions, in the second vehicle group that is a tail end group of the platoon, a vehicle having smaller remaining energy at a position closer to platoon front, that is, the smaller remaining energy vehicles come forward in the travel direction (i.e., come closer to a top) in the platoon.

The travel resistance for each of the platoon vehicles is smaller for the vehicle in the middle of the platoon than for the top vehicle or for the tail end vehicle of the platoon. Therefore, by positioning the smaller remaining energy vehicles in the middle of the platoon, a travelable distance of such vehicles (i.e., traveling in a middle of the platoon vehicles) can be extended.

In case that a platoon includes three types of vehicles respectively forming separate groups, the platoon travel system positions, in the third vehicle group that is configured to be positioned in between the first vehicle group and the second vehicle group, a vehicle having the larger remaining energy at a position closer to platoon front, that is, the larger remaining energy vehicles come forward in the travel direction (i.e., come closer to a top) in the platoon.

Modification Example 3

In the final position determination process of the above-mentioned embodiment and the modification example 1, the join position is determined based on a depart point of the joining vehicle and a depart point of each of the platoon vehicles. However, the present disclosure is not limited to such configuration. As shown in the modification example 3, in the final position determination process, a join position may be determined based on the travel output of the joining vehicle and the travel output of the each of the platoon vehicles. The platoon travel system in the modification example 3 is mostly the same as the one in the above-mentioned embodiment. Here, description is focused to the difference of the processing operation of the platoon travel system in the modification example 3 from the one in the above-mentioned embodiment.

The platoon travel system in the modification example 3 differs from the one in the above-mentioned embodiment on the following points. That is, the differences are: (i) an input of information which shows the travel output of the self-vehicle to the ECU 10 (i.e., the join-in processor 14), (ii) a transmission and a reception of the information which shows the travel output to and from the nearby vehicles, and (iii) the contents of the final position determination process. For example, in the modification example 3, the information (i.e., travel output information) which shows the travel output is acquired in Step S32 of FIG. 6.

A configuration for outputting the information which shows the travel output of the self-vehicle to the ECU 10 may be, for example, that the behavioral information sensor 70 stores the travel output of the self-vehicle and the sensor 70 outputs the travel output of the self-vehicle. A configuration for outputting the information which shows the travel output of the self-vehicle to the join-in processor 14 of the ECU 10 may be, for example, that a memory (e.g., ROM, RAM) of the ECU 10 memorizes the travel output of the self-vehicle and the memory of the ECU 10 outputs the memorized travel output of the self-vehicle.

Figure 20:
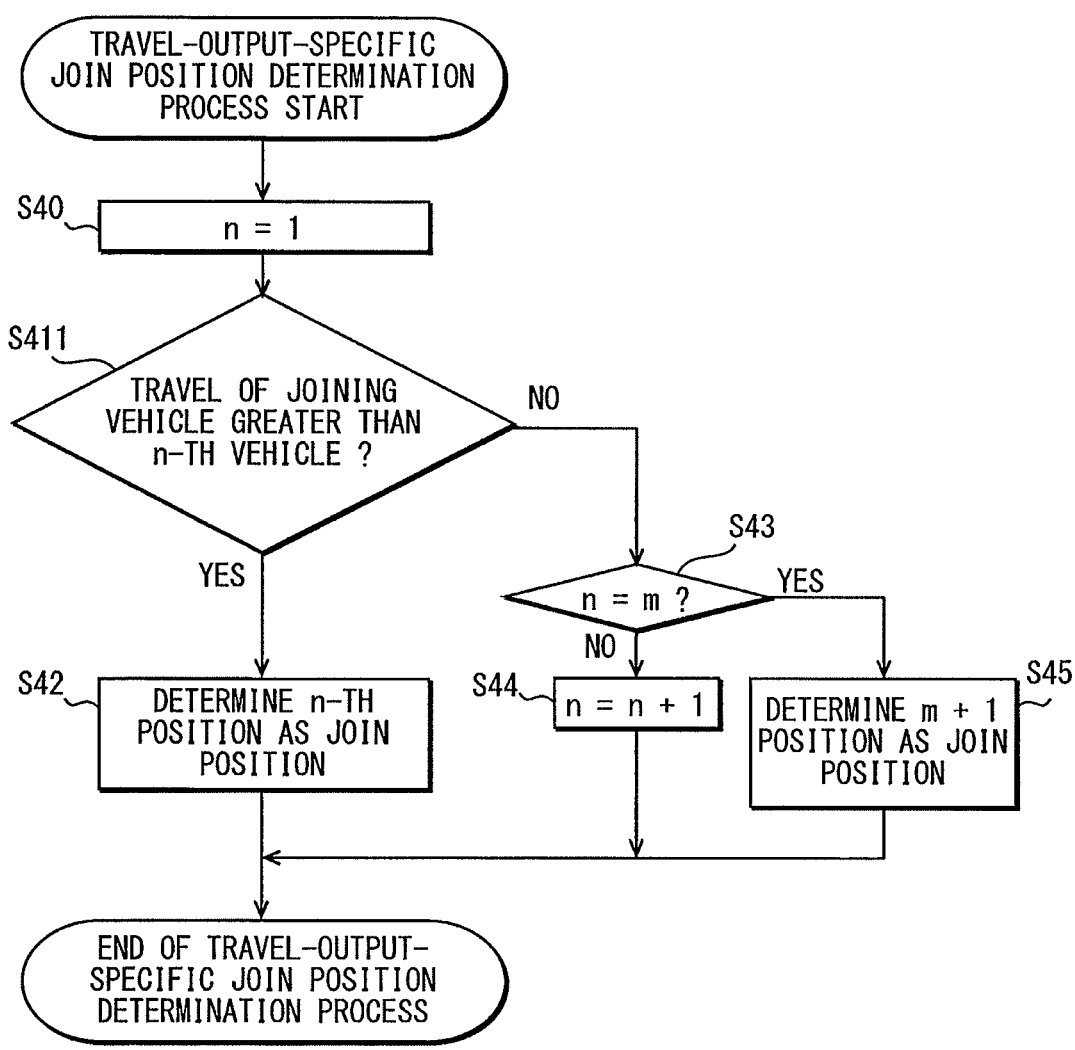
FIG. 20 is a flowchart of an output specific position determination process by the platoon travel controller in a third modification.

Here, with reference to FIG. 20, the final position determination process in the modification example 3 is explained. As a reminder, the final position determination process in the above-mentioned embodiment determines in Step S40 whether a depart point of the joining vehicle is either the same point as or nearer than a depart point of the n-th vehicle. On the other hand, the final position determination process in the modification example 3 determines in Step S411 whether the travel output of the joining vehicle is higher than the travel output of the n-th vehicle. Therefore, in the flowchart of FIG. 20, the same contents of the final position determination process as the one in the above-mentioned embodiment have the same step numbers as FIG. 7, for the brevity of the explanation by avoiding the repetition.

In Step S411, the join-in processor 14 determines whether the travel output of the joining vehicle is higher than the remaining energy of the n-th vehicle. When it is determined that the travel output of the joining vehicle is higher than the n-th vehicle, the process proceeds to Step S42, and, when it is determined that the travel output of the joining vehicle is not higher than the travel output of the n-th vehicle, the process proceeds to Step S43.

In such manner, the platoon travel system positions, in the first vehicle group that is a top group of the platoon, a vehicle having higher travel output at a position closer to platoon front, that is, the higher travel output vehicles come forward in the travel direction (i.e., come closer to a top) in the platoon. Further, the platoon travel system positions, in the second vehicle group that is a tail end group of the platoon, a vehicle having lower travel output at a position closer to platoon front, that is, the lower travel output vehicles come forward in the travel direction (i.e., come closer to a top) in the platoon.

The travel resistance for each of the platoon vehicles is smaller for the vehicle in the middle of the platoon than for the top vehicle or for the tail end vehicle of the platoon. Therefore, by positioning the lower travel output vehicles in the middle of the platoon, such vehicles traveling in the middle of the platoon can travel with lower energy. Therefore, deterioration of the energy consumption of the whole platoon is prevented. Further, by positioning high travel output vehicles at a top and at a tail end of the platoon, the platoon travel of the vehicles is made smoother and faster.

In case that a platoon includes three types of vehicles respectively forming separate groups, the platoon travel system positions, in the third vehicle group positioned in between the first vehicle group and the second vehicle group, a vehicle having higher travel output at a position closer to platoon front, that is, the higher travel output vehicles come forward in the travel direction (i.e., come closer to a top) in the platoon.

Modification Example 4

Figure 21:
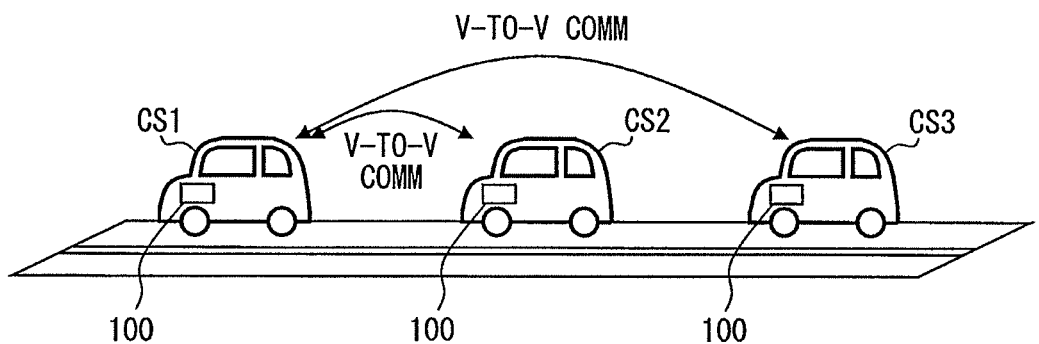
FIG. 21 is an illustration of the platoon travel system in a fourth modification.

The multi-master method is used in the above-mentioned embodiment and the modification examples 1 to 3. However, the present disclosure is not limited to such configuration. A master-slave method may also be used in the platoon travel system of the present disclosure as shown in FIG. 21. Even when such master-slave method is used in the platoon travel system of the present disclosure, the same effect as the above-mentioned embodiment is achieved. However, the information regarding vehicle safety is exchanged among the platoon vehicles via the vehicle-to-vehicle communication between them. The information about vehicle safety is the information required for the prevention of the collision of the vehicles, such as the information which shows the inter-vehicle distance, the information which shows the change of the inter-vehicle distance, the brake information which shows the amount of press of a brake pedal, and the like.

In case that the master-slave method is used, the ECU 10 disposed in a master vehicle performs the join-in reception process, the departure reception process, and the platoon re-organization reception process described in the above (e.g., in FIG. 4). However, the synchronization process and the platoon join-in process of the join-in reception process are performed by the ECU 10 in the master vehicle, by the ECU 10 in slave vehicles, and by the ECU 10 in the joining vehicle. Further, the ECU 10 in the master vehicle, the ECU 10 in the slave vehicles, and the ECU 10 in a departing vehicle respectively perform the synchronization process and the platoon departure process of the departure reception process. Further, the ECU 10 in the master vehicle and the ECU 10 in the slave vehicles respectively perform the synchronization process and the platoon re-organization process of the platoon re-organization reception process.

Modification Example 5

Figure 22:
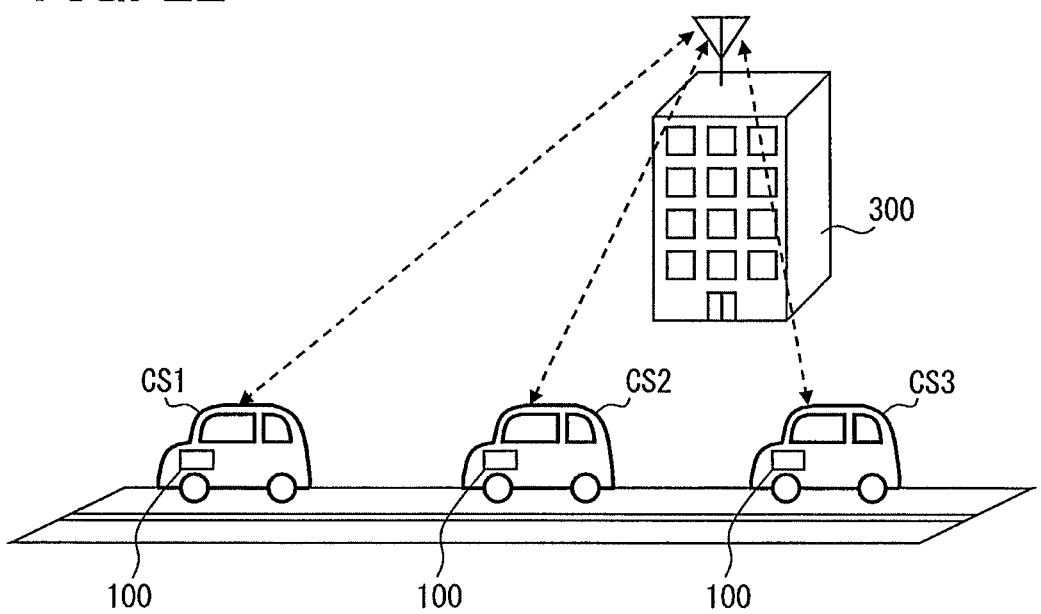
FIG. 22 is an illustration of the platoon travel system in a fifth modification.

The multi-master method is used in the above-mentioned embodiment and the modification examples 1 to 3. However, the present disclosure is not limited to such configuration. As shown in FIG. 22, a data center method may also be used in the platoon travel system of the present disclosure. Even when the platoon travel system uses the data center method, the same effect as the above-mentioned embodiment is achieved. However, the information regarding vehicle safety is exchanged among the platoon vehicles via the vehicle-to-vehicle communication between them.

In case that the data center method is used, a data center 300 performs the join-in reception process, the departure reception process, and the platoon re-organization reception process described above (see FIG. 4 for example). However, the ECU 10 in the master vehicle, the ECU 10 in the slave vehicles, and the ECU 10 in the joining vehicle respectively perform the synchronization process and the platoon join-in process of the join-in reception process. Further, the ECU 10 in the master vehicle, the ECU 10 in the slave vehicles, and the ECU 10 in the departing vehicle respectively perform the synchronization process and the platoon departure process of the departure reception process. Further, the ECU 10 in the master vehicle and the ECU 10 in the slave vehicles perform the synchronization process and the platoon re-organization process of the platoon re-organization reception process.

The data center 300 is capable of performing the join-in reception process, the departure reception process, and the platoon re-organization reception process, and, in the data center 300, computers such as servers and the like that are installed. The servers in the data center 300 are capable of wirelessly communicating with the on-board unit of the vehicles that use the platoon travel system. Therefore, the computers in the data center 300 perform the join-in reception process, the departure reception process, and the platoon re-organization reception process. Further, in the data center method, the communication device 20 of the vehicles that use the platoon travel system is implemented as a device having a road-to-vehicle communication function for the communication with the data center 300.

Such changes, modifications, and summarized schemes are to be understood as being within the scope of the present disclosure as defined by appended claims.

What is claimed is:

1. A platoon travel system for organizing a platoon of plural vehicles and performing a platoon travel of the plural vehicles along a preset travel route, the platoon travel system comprising:
at least one processor located in an Electronic Control Unit (ECU), and a memory, the at least one processor is configured to, based on executing instructions stored in the memory:
acquire, by a first acquisition unit, from each of the plural vehicles, projection area information which includes a projection area of each vehicle;
acquire, by a second acquisition unit, from each of the plural vehicles, depart point information which includes a depart point at which each vehicle is to depart from the preset travel route of the platoon;
divide, by a grouping unit, the plural vehicles into a top group and a tail end group based on the projection area information, among which the vehicles with the projection area in a first range belong to the top group and the vehicles with the projection area in a second range belong to the tail end group, and the second range is less than the first range;
determine, by a final position determination unit, an in-group position of each of the plural vehicles in the vehicle groups based on the depart point information;
position the top group vehicles in an ascending order of depart point distances based on the depart point information;
position the tail end group vehicles in a descending order of depart point distances based on the depart point information;
transmit, via a transmitter cooperative with the ECU, to the each of the plural vehicles, platoon information, which reflects the position of each of the plural vehicles as determined by the final position determination unit and inter-vehicle distance; and
control a self-vehicle of the plural vehicles, via a travel system component cooperative with the ECU of the self-vehicle, according to the position of the self-vehicle as determined by the final position determination unit, which is reflected in the platoon information.

2. The platoon travel system of claim 1, wherein
the grouping unit determines, based on the projection area information of a joining vehicle joining in the platoon, a join-in group in which the joining vehicle joins,
the final position determination unit determines a join position of the joining vehicle in the join-in group based on the depart point information of the joining vehicle, and
a first drive unit is provided, performing a speed reduction control of the vehicles that are positioned behind the join position to reserve a join space at the join position in the platoon.

3. The platoon travel system of claim 2, further comprising:
a join-in permission prohibition determination unit determining whether a join-in permission prohibition is given to the joining vehicle when the joining vehicle joins in the platoon, wherein
the join-in permission prohibition determination unit determines that the join-in of the joining vehicle is permitted when a depart point of the joining vehicle is within a preset range from a depart point of each of vehicles in the platoon, and
the join-in permission prohibition determination unit determines that the join-in of the joining vehicle is prohibited when the depart point of the joining vehicle is not within the preset range from the depart point of each of vehicles in the platoon.

4. The platoon travel system of claim 2, further comprising:
a join-in permission prohibition determination unit determining whether a join-in permission prohibition is given to the joining vehicle when the joining vehicle joins in the platoon, wherein
the join-in permission prohibition determination unit determines that the join-in of the joining vehicle is permitted when a number of vehicles currently participating in the platoon is equal to or less than a preset value, and
the join-in permission prohibition determination unit determines that the join-in of the joining vehicle is permitted when the number of vehicles currently participating in the platoon is greater than the preset value.

5. The platoon travel system of claim 1, further comprising:
a second drive unit performing a speed reduction control of vehicles ahead of a post-departure space to reduce the post-departure space, when the post-departure space is formed by a departure of a vehicle from the platoon.

6. The platoon travel system of claim 1, wherein
the grouping unit divides, based on the projection area information, the plural vehicles into the top group, the tail end group, and a middle group that is positioned in between the top group and the tail end group, and
the grouping unit groups, in the middle group, vehicles having a lesser projection area than the first range and larger than the second range.

7. The platoon travel system of claim 6, wherein
the final position determination unit determines vehicle positions in the middle group in the ascending order of depart point distances from the tail end of the platoon when all vehicles in the follow group have departed from the platoon.

8. The platoon travel system of claim 7, further comprising:
a third drive unit performing a drive control of the vehicles in the middle group for realizing the vehicle positions determined by the final position determination unit when all vehicles in the follow group have departed from the platoon, wherein
the third drive unit performs the drive control during a travel of the vehicles.

9. The platoon travel system of claim 8, wherein
the third drive unit performs the drive control at a restart time after a parking of all vehicles in the platoon at a parking space.

10. The platoon travel system of claim 1, further comprising:
a save unit saving a top travel record which includes a travel history of a self-vehicle traveling at a top of the platoon; and
an incentive unit providing an incentive according to the top travel record in the travel history.

11. The platoon travel system of claim 10, wherein
the incentive unit is provided in a control center disposed externally outside of the vehicle and is capable of wirelessly communicating with the vehicle, and
a communication unit is provided in the vehicle, performing communication with the control center for transmission of the top travel record to the control center.

12. The platoon travel system of claim 11, wherein
the control center is an electric toll collection system, and the incentive unit gives, as the incentive, a preset monetary discount for a highway toll.

13. The platoon travel system of claim 11, wherein
the control center is a center of a national or local government, and
the incentive unit gives, as the incentive, a preset deduction of vehicle-related tax.

14. The platoon travel system of claim 10, further comprising:
an approval unit providing an approval by mutually examining contents of the top travel record among the vehicles in the platoon, wherein
when the contents of the top travel record are approved, the incentive unit gives the incentive based on an approval result of the approval unit.

15. A platoon travel system for organizing a platoon of plural vehicles and performing a platoon travel of the plural vehicles along a preset travel route,
the platoon travel system comprising:
at least one processor located in an Electronic Control Unit (ECU), and a memory, the at least one processor is configured to, based on executing instructions stored in the memory:
acquire, by a first acquisition unit, from each of the plural vehicles, projection area information which includes a projection area of each vehicle;
acquire, by a second acquisition unit, from each of the plural vehicles, remaining energy information which includes an amount of remaining energy left in each vehicle;
divide, by a grouping unit, the plural vehicles into a top group and a tail end group based on the projection area information among which the vehicles with the projection area in a first range belong to the top group and the vehicles with the projection area in a second range belong to the tail end group, and in which the second range is less than the first range;
determine, by a final position determination unit, an in-group position of each of the plural vehicles in the vehicle groups based on the remaining energy information;
position the top group vehicles in a descending order of the remaining energies;
position the tail end group vehicles in an ascending order of the remaining energies;
transmit, via a transmitter cooperative with the ECU, to the each of the plural vehicles, platoon information, which reflects the position of each of the plural vehicles as determined by the final position determination unit and inter-vehicle distance; and
control a self-vehicle of the plural vehicles, via a travel system component cooperative with the ECU of the self-vehicle, according to the position of the self-vehicle as determined by the final position determination unit, which is reflected in the platoon information.

16. A platoon travel system for organizing a platoon of plural vehicles and performing a platoon travel of the plural vehicles along a preset travel route,
the platoon travel system comprising:
at least one processor located in an Electronic Control Unit (ECU), and a memory, the at least one processor is configured to, based on executing instructions stored in the memory:
acquire, by a first acquisition unit, from each of the plural vehicles, projection area information which includes a projection area of each vehicle;
acquire, by a second acquisition unit, from each of the plural vehicles, horsepower output information which includes a horsepower output of each vehicle;
divide, by a grouping unit, the plural vehicles into a top group and a tail end group based on the projection area information among which the vehicles with the projection area in a first range belong to the top group and the vehicles with the projection area in a second range belong to the tail end group, and in which the second range is less than the first range; and
determine, by a final position determination unit, an in-group position of each of the plural vehicles in the vehicle groups based on the horsepower output information;
position the top group vehicles in a descending order of the horsepower outputs;
position the tail end group vehicles in an ascending order of the horsepower outputs;
transmit, via a transmitter cooperative with the ECU, to the each of the plural vehicles, platoon information, which reflects the position of each of the plural vehicles as determined by the final position determination unit and inter-vehicle distance; and
control a self-vehicle of the plural vehicles, via a travel system component cooperative with the ECU of the self-vehicle, according to the position of the self-vehicle as determined by the final position determination unit, which is reflected in the platoon information.

* * * * *